United States Patent

Caci

[19]

[11] Patent Number: 6,154,658
[45] Date of Patent: Nov. 28, 2000

[54] VEHICLE INFORMATION AND SAFETY CONTROL SYSTEM

[75] Inventor: Joseph Claude Caci, Owego, N.Y.

[73] Assignee: Lockheed Martin Corporation, Owego, N.Y.

[21] Appl. No.: 09/266,644

[22] Filed: Mar. 11, 1999

Related U.S. Application Data

[60] Provisional application No. 60/112,297, Dec. 14, 1998.

[51] Int. Cl.$^7$ .............................. H04M 11/00; H04Q 7/32
[52] U.S. Cl. ........................... 455/466; 455/99; 455/556; 455/557; 455/66; 455/553; 455/72
[58] Field of Search ..................................... 455/466, 556, 455/557, 74, 99, 575, 88, 66, 553, 72

[56] References Cited

U.S. PATENT DOCUMENTS

| 5,732,074 | 3/1998 | Spaur et al. | 455/457 |
| 5,819,184 | 10/1998 | Cashman | 455/553 |
| 6,038,430 | 3/2000 | Thomson, et al. | 455/72 |

OTHER PUBLICATIONS

"Intelliworxx and ComROAD Present In–Vehicle Computer System Powered by Intel Pentium Processor", worldwide web Mar. 25, 1999; Intelliworxx, Inc., Sarasota, FL.

*Primary Examiner*—Lee Nguyen
*Assistant Examiner*—Simon Nguyen
*Attorney, Agent, or Firm*—W. H. Meise; R. P. Cogan

[57] ABSTRACT

A Vehicle Information and Safety System (VISC) includes a main computer at a vehicle fleet headquarters (HQ) with access over a CDPD data network to a computerized sensor system mounted in each vehicle of the fleet. Sensors which may be used include load sensors coupled to the axles, accelerometers and temperature sensors coupled to the cargo bay, infrared andor pressure sensors monitoring the operator, cameras viewing the cargo bay, cab andor environment, and GPS data. The sensor data are processed by in-vehicle andor HQ computers, to monitor the state of the vehicle and operator, and the security status of the vehicle. PSAP (911) calls can be transmitted from the vehicle under remote control from the HQ for those cases in which the operator is unavailable or unresponsive, and the transmission can be tagged with GPS data. Speech signals from the operator are converted to text, and may be used for control of various functions, or may be data-compressed for transmission over the data network to HQ. Commands such as route or schedule changes may be transmitted as data text to the vehicle, where the data is converted to synthetic speech. Pick-ups and deliveries are logged by any one or all of operator voice, barricades, camera notes, digitized signatures, GPS and time data. A circuit-switched cellular radio is provided for use when the CDPD network is unavailable.

4 Claims, 10 Drawing Sheets

| Computer/Operator Recognized Noun or Phrase | Computer/Operator Recognized Verb or Action | Data Text-to-Speech Transaction Description and Action Taken |
|---|---|---|
| Vehicle | Turn-On-To | Directional Verbs with implied noun vehicle |
| Vehicle | Left Turn | |
| Vehicle | Right Turn | |
| Speed | Stop | Motion directions |
| Log | Proceed "Direction" i.e. North, South, East, etc. | Voice log of course corrections, additions and other changes |
| VISC Annotate This Position | Annotate operator's landmark description with GPS point | Position marking commands to tag GPS and create navigation point with landmark descriptions. |
| VISC Mark Position | Mark position with some identification reference | Reference this position for future use. Use GPS and map to create a navigation point with unique identifier uploaded to mainframe. The VISC may ask operator for identifier. |
| VISC What is My Position | Call Out | Request for location |
| VISC Cargo is | Delivered | Delivery transactional log entries |
| VISC Log Package Delivery Report | Package or Cargo is Refused, or Accepted, or Not Deliverable | Annotate Track and Trace Log and send log entry to mainframe computer |
| Operator Attention, Load | Is Shifting and Unstable | Description of Load and cargo condition. Stop vehicle and secure cargo. |
| Operator Attention, Speed | Is Too Fast for Conditions | Reduce speed and watch curves and corners. |
| VISC Estimate Fuel Reserves | VISC Estimate of fuel situation | Measure fuel supply, compute fuel consumption rate and estimate time to next refuel |
| Warning | Situation Description | Operator Alert condition is enunciated |
| Unit to OPS center | Open | Request for voice contact to operations center |
| 911 | Dial | Emergency call for help, dial 911 |
| Emergency help | Dial | Dial 911 |
| VISC OPS Priority Flash | Send Flash Contact Data Message Digital Voice message | Send emergency alert message to operations center |
| Record "message goes here" | Digital Voice Log Open | Record speech and convert to low bit rate voice for IP network transmission. |
| Record Off | Close Voice Log | Close out log and send data |

Figure 8

Speech Data Lexicon Table

Example of Bi-directional Text-to-Speech Language

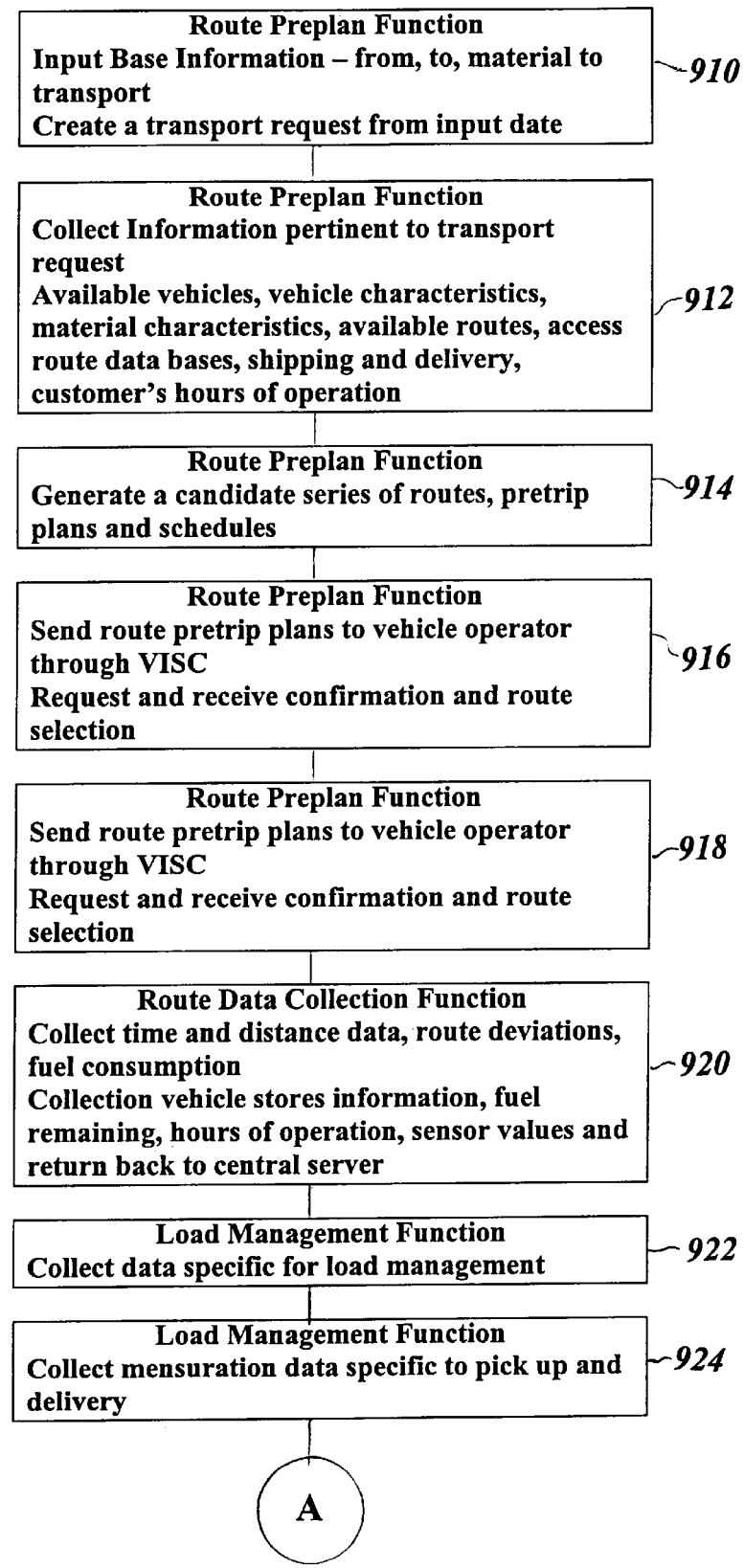
Figure 9a High Level Software Function
Flow Chart

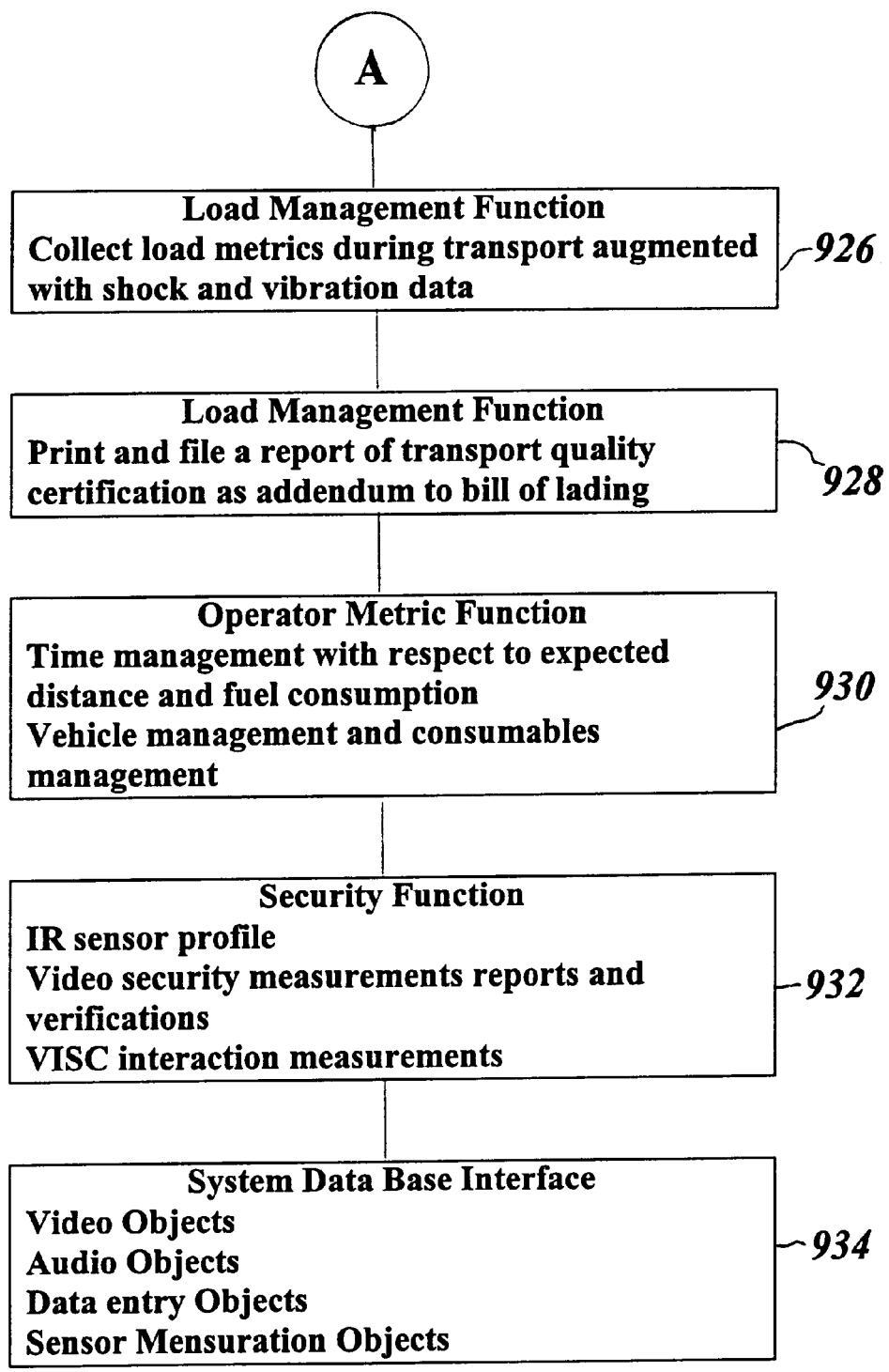
FIGURE 9b System Top Level Flow Chart

VEHICLE INFORMATION AND SAFETY CONTROL SYSTEM

This application claims priority of Provisional Patent Application Ser. No. 60/112,297, filed Dec. 14, 1998.

FIELD OF THE INVENTION

This invention relates to a system and method for improving transportation of goods, and more particularly to the application of voice and data communications to at least one of route control, vehicle operation, or pick-up or delivery verification.

BACKGROUND OF THE INVENTION

Transportation is a key component of our modern industrial society, and its rapid and cost-effective performance has an important effect on the well-being of society. Operation of transportation systems in times past was essentially under the control of the vehicle operator, for there was no convenient means for the vehicle operator to communicate with a headquarters. This method often resulted in delivery of goods which were damaged by exposure to adverse environmental conditions, or by spoilage, which might result, for example, from unavailability of the pick-up source or the delivery recipient at the time of arrival of the vehicle. With the widespread availability of land-based Public Service Telephone Network (PSTN) telephones, the vehicle operator could periodically stop and report in to his headquarters, and receive updated pick-up or delivery information. The use of land-line communications was a great improvement over the prior lack of communication, and substantially improved transportation. Some transportation system owners adopted use of radio communications, but the range of readily-available was generally insufficient for more than local communications updates. The advent of cellular telephones and satellite communications allowed instantaneous updates of certain information, including the present location of the vehicle, changes or updates to the route or route schedule, and the like.

Some corporate fleet control center networks use reporting systems based on digital cellular or proprietary radio systems to connect to the vehicle. This method uses two-way messaging communications to the vehicle operator. The operator uses an onboard computer terminal to send a transaction log entry or help message through the digital cellular system to a company dispatcher. If the message is an emergency, the company dispatcher becomes an intermediary to the 911 dispatcher. There are two distinct disadvantages to this technique, the first being that the operator may not be in a position to operate the vehicle and the messaging device simultaneously, and the second being delay and possible miscommunication attributable to the presence of an intermediary. Also, the intermediary approach is disliked by 911 system operators, who prefer to have voice communication directly with the user or principal.

Computers are being installed in vehicles to provide navigation and communications. One of the most advanced publicly disclosed is the Columbus project from Bell Labs. This system consists of vehicular component called a Personal Travel Assistant, and cellular communications with special data protocol and GPS. The fixed end computer is a data base server which holds the map and address information. The user interface is a touch screen and synthesized text-to-speech voice. The screen automatically updates as the vehicle is driven. The GPS is used to tell the centralized data base server where the vehicle is and what map segment is needed. The vehicle computers are small portable scanners with keyboards used to read bar codes and to log transactions. These devices are sometimes equipped with proprietary radios or cellular radios to relay the transaction log entry back to the centralized server. The vehicle operator may use a cellular phone in conjunction with any of the above and may dial 911 to report an emergency and request help. A second call may also be placed to the corporate control point.

One of the deficiencies of prior systems is adverted to above, namely that a conference call between the vehicle operator, corporate transport manager and 911 operator is not possible for several technical reasons. The vehicle operator must often connect with both, but can do so only one at a time, because a cellular phone system is a point-to-point system. Another problem with use of the 911 system with wireless communications is that it is not easy to trace the connection back to the cellular phone, or to locate the originating cellular telephone exactly. A yet further problem is that 911 is a phantom switch number, in that the actual number of the PSAP serving the jurisdiction is unknown, except by the Telco. There are thousands of PSAPs across the country, and provision and update of the actual telephone numbers would in itself be a complex database task. Dialing a PSAP using the 911 number in a particular jurisdiction using a wireless telephone requires that the signal originate in that jurisdiction.

In the wire line system, it is relatively easy to trace the call back through the switch to the wire pair from which the call originates. Digital switches with a cable-pair database can look up the location of the cable pair incoming end point and provide the 911 operator with the address. Calls from cellular networks are a challenge to 911 operators, because location information is not readily available as in wire line systems. Progress is being made in providing some capability to do wireless location but, universal accurate wireless location is not currently available.

Improved transportation control is desired.

SUMMARY OF THE INVENTION

A system or method according to an aspect of the invention generally provides for one or more of (a) controlling the routing of a delivery vehicle, (b) monitoring the conditions under which the vehicle is being operated, and (c) verifying delivery of at least a portion of the load, or may provide for any two, or all three of these functions, and related functions. The initial routing planning function, if used, is performed prior to a trip by a vehicle. The initial routing involves collecting "initial" information, which may relate to the characteristics of the load to be carried, the characteristics of the vehicle on which the load will be carried, the characteristics of the vehicle operator, the characteristics of at least two different routes over which the vehicle can be routed (even though portions of two different routes may include common portions), relevant traffic statutes, ordinance and regulations, andor characteristics of the delivery provider and recipient. The initial data is processed, for generating an optimum route, and the resulting route information is provided to the vehicle (or to its operator). According to an optional aspect of the invention, "in-trip" data is collected during the trip. In-trip data relates to operating andor operation parameters of the vehicle and the operator, and vehicle location, or progress along the route. The in-trip data is processed, to thereby update the step of generation of an optimum route, to thereby generate an updated optimum route, and for providing instructions other than route instructions to the vehicle operator, as desired. According to another aspect of the invention, the steps of collecting data and generating an updated optimum route are repeated. According to a yet further aspect of the invention which may be used in conjunction with any of the preceding aspects, "pick-up data" is collected concurrent with pick-up of the load or of any portion of the load. Pick-up data relates to the characteristics of the picked-up portion of the load, and to the identity of the source of the picked-up portion. The pick-up data is processed for further use, which may include invoice generation, billing, insurance, or the like. Similarly, according to a yet further aspect of the invention which may be used in conjunction with any one, any combination of, or all of the preceding aspects, "delivery data" is collected concurrent with delivery of the load, or of any portion of the load. Delivery data relates to the characteristics of the delivered portion of the load, and to the identity of the individual or company to whom the load, or portion thereof, was delivered. The delivery data is processed for further use, which may include billing, delivery certification, or the like.

According to another aspect of the invention, a communication system for a vehicle includes a switched-circuit cellular radio communication transceiver located in the vehicle, and a first CDPD network (or its equivalent) data transceiver also located in the vehicle. A second CDPD network port is located at a site remote from the vehicle, and communicates with the first CDPD transceiver. In a preferred embodiment of this aspect of the invention, the second CDPD network port is located at the site of a corporate fleet operations control center. A speech-to-signal converter such as a microphone and amplifier or a microphone, amplifier and digitizer is provided, for generating uncompressed speech signals. In the preferred embodiment of this aspect of the invention, the speech-to-signal converter is located at the corporate fleet operations control center. A vocoder transmitter, which may, in principle, be located anywhere, is coupled to the speech-to-signal converter and to the second CDPD network port, for reducing the data rate of the uncompressed speech signals which are coupled from the speech-to-signal converter to the second network port, as a result of which, or whereby, the reduced-data-rate speech signals are generated at the output port of the first CDPD network data transceiver. A vocoder receiver is coupled to the output of the first CDPD network data transceiver, for generating uncompressed signals which represent a synthesized version of the uncompressed speech signals. This first CDPD network data transceiver is colocated with the vehicle, as by being carried therewith. A control arrangement is coupled to the first CDPD network data transceiver and to the switched-circuit cellular radio communication transceiver, for responding to commands transmitted over the second network port by enabling the switched-circuit cellular radio communication transceiver for dialing a particular telephone number, and for coupling the uncompressed signals from the output port of the vocoder receiver to the the switched-circuit cellular radio communication transceiver, as a result of which, or whereby, speech signals from the speech-to-signal converter, which is a microphone in a preferred embodiment, may be compressed, transmitted over the CDPD network to the vehicle, uncompressed, and retransmitted over the circuit-switched cellular radio transceiver to be received by the accessed number. In an exemplary use of the invention, the accessed number may be a 911 emergency number, which may use its own locating equipment to localize the source of the cellular radio transmission.

In a further embodiment of this particular invention, the vehicle carries a Global Positioning Receiver, and the vehicle location as determined by the GPS receiver may automatically be converted into speech and transmitted over the switched cellular radio transmitter.

BRIEF DESCRIPTION OF THE DRAWING

FIG. 8 is a table listing some words which may be used in a text-to-speech converter which may be used in the vehicle of FIGS. 1 and 2; and FIGS. 9a and 9b together represent a simplified flow chart or diagram representing the operation of a system according to the invention.

DESCRIPTION OF THE INVENTION

Figure 1:
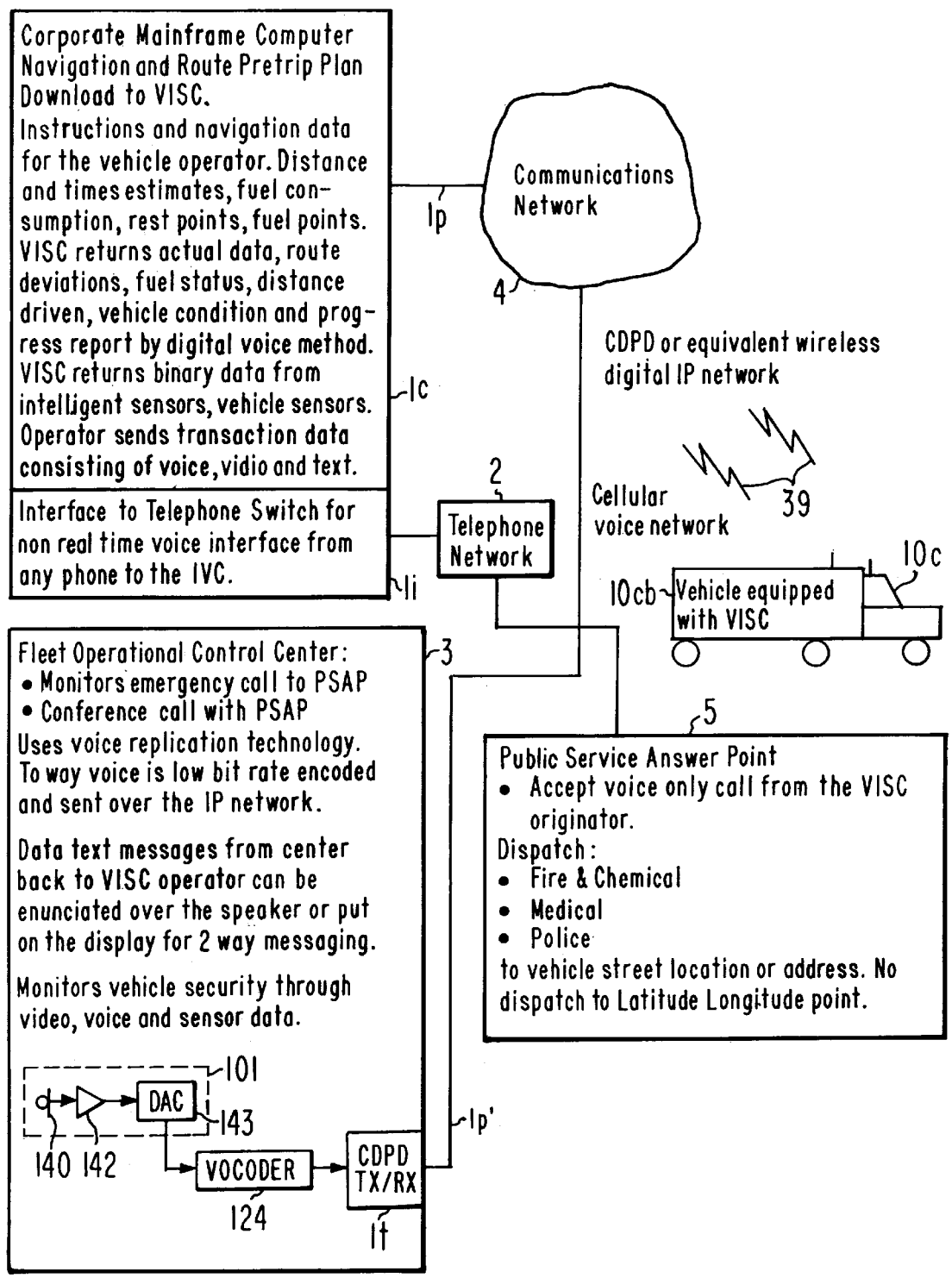
FIG. 1 is a simplified block diagram of one embodiment of the overall VISC system according to an aspect of the invention.

This invention melds information from the fields of transportation, public safety, telecommunications and computers, and brings together intelligence collecting sensor technology, digital voice technology, video, intelligent software and computer technology with telecommunication services and public safety services. The Vehicle Information and Safety Computer (VISC) system which represents an embodiment of the invention includes a system and method which, taken as a whole, or as individual portions, can provide large transport fleet owners, delivery services and small business fleets with transaction processing and comprehensive real time vehicle management. Use of the invention, or parts thereof, may allow mercantile transactions to be managed faster, or with greater accuracy. Vehicle operators or drivers may also benefit from safety apparatus and methods aspects of the invention portions of which may provide faster or more reliable voice communications to the Public Service Access Point (PSAP) and simultaneously to the vehicle owning company operations center. The VISC includes portions which are mounted on one or more vehicles of a fleet of vehicles, and also includes portions which are located at the company operations center, where the required software is run on a computer, which may be a mainframe computer or its equivalent.

Before considering the FIGURES illustrating the preferred embodiment, it may be worthwhile to consider how the overall apparatus would be used. The VISC, taken as a whole, is intended to provide transaction automation and security for the vehicle operator and vehicle owner. Before the vehicle begins to traverse the route, the administrator responsible for designing or establishing the route schedules a route plan, which is preferably performed using the corporate fleet operation control center (main) computer. For this purpose, the term "route" includes route layout, bill of lading, and a list of transactions (loadings and unloadings) to be accomplished. The route administrator performs these route planning functions using specialized software loaded onto the main computer. The administrator is typically at a headquarters where the centralized order, dispatch and billing systems are located. This route plan data for a specific vehicle is downloaded to the vehicle through, or using, a mobile Internet Protocol (IP is a software protocol that can transport and route itself through switching equipment). Mobile IP is sometimes used interchangeably with Cellular Digital Packet Data (CDPD). CDPD is specific to Advanced Mobile Phone Systems or AMPS. There are other protocols that will be similar to Cellular Digital Packet Data CDPD but used on PCS, CDMA and GSM networks that will function interchangeably with CDPD and thus provide end to end data connectivity. There are still other protocols again similar but designed for satellite use. These mobile IP standards are public standards for which hardware manufacturers must certify compliance before receiving a certification. The equipment referenced in FIGS. 2 and 7 must be so certified. This network can be either terrestrial-cellular- or satellite-based. There is no constraint that the vehicle be collocated with the corporate fleet operation control center in order to download the route plan. The vehicle may be in any location. For example, the mobility control protocol of a CDPD network keeps track of the vehicle throughout the route territory, even on the national level, while maintaining an IP connection back to a fixed end system, which is typically the corporate fleet control center mainframe computer or server. The fleet administrator downloads the route data for the upcoming vehicle mission directly to the vehicle.

The vehicle VISC is ideally always online regardless of engine or operator state. The downloaded data preferably includes, but is not limited to, a route plan consisting of starting point, highway number or other identification of the first segment of the route, and estimated distance and time on each highway segment. Additional information such as refueling points, rest points and overnight stops may also be included. If, at some point in highway systems development, a data base of national highway conditions becomes available, the data base could be accessed for additional information, such as, for example, the locations of ongoing highway repair, or the state of a section of highway which is traversable, but not completed. The refueling points may also participate in the system by using electronic commerce connections to offer updated (presumably competitive) fuel prices, receive orders for fuel order quantities, and for transfer of account billing data.

During the trip, the in-vehicle portion of the VISC system reports back to the main computer the actual highway segment values, including additional information derived from on-board sensors. These values are compared statistically to the estimated values to keep up the accuracy of the centralized route generating program. Flags are set when deviation goes beyond normal values. Fuel consumption, for example, is an important factor in transport, and may be measured. The measured value of fuel mileage can be used to improve the fleet efficiency. For example, in a fleet of 5000 trucks, with each truck traveling 600 miles per day and consuming 100 gallons per day, an efficiency increase of as low as 5% could save 5 gallons per truck per day or 25,000 gallons for the fleet per day. Even lesser improvements in efficiency could result in sizable savings.

During the course of traversing the route, construction may be encountered, which may cause delays. Accidents and other types of unexpected delays can cause the vehicle to fall behind schedule. With GPS location data and operator vocalized location data, and the CDPD or IP network, this information is sent to the route planning component of the main computer at the corporate fleet operations control center. The main computer, with large, sophisticated, and detailed maps, searches for an alternate route. If found, the updated route information is downloaded to the VISC and to the vehicle operator in either or both visual and aural form. The main computer, using special bi-directional aural-to-digital navigation text messaging, sends instructions to the vehicle operator in the form of route identification, andor in the form of landmark information with time and distance data. The presentation of the data in both aural and in visual form frees the operator to concentrate on operating the vehicle and navigating. A further example of presentation can be shown by which the data to the operator may be visual but the data to the VISC may be aural. The operator may request an overlay of restaurant locations or other business information as from the "Yellow" pages of a telephone directory or other such data base which contains an address suitable for reverse Geographic coding onto a map segment of latitude and longitude. Then using the text-to-speech VISC function, call out the distance or computed time of arrival until the address point is reached. This includes the ability to receive and display download map segments at any level of detail initiated on operator's voice request from the fleet operations mainframe computer, along with and including other pertinent information overlaid on the map such as location of business like restaurants, truck repair, fuel stations and others as may be needed and requested by the vehicle operator;

Vehicle and cargo safety is a critical concern. These concerns are addressed in the preferred embodiment though the use of sensors to identify the vehicle operator. When the sensors indicate an unauthorized operator change, entry to the cargo area or other measurable condition, the VISC sends an emergency message to the fleet operations control center. From there, the fleet administrator is in a position to actively monitor the vehicle and send an emergency 911 call through the VISC or dial directly using the PSAP data base on the mainframe. Of key importance to the fleet administrator is some means to verify operator identity. This can be done through the use of a special indicator in the cab, aural or visual which is a coded signal to the operator to respond with a known code which can be a switch activation or specific speech number sequence or code phrase to verify operator identity prior to opening a live microphone (mike). It can also be done through intelligent sensors which provide data to the VISC confirming the continuity of the operator.

FIG. 1 is a simplified block diagram of one embodiment of the overall VISC system according to an aspect of the invention. In FIG. 1, a control center computer 1c communicates data with a fleet operations control center or "headquarters" 3 and with a Public Service Answer Point (a "911 center") 5 by way of a communications network 4, which may be viewed as being a combination of virtual private wireline network and a wireless network. Network 4 also communicates by means of radio or other electromagnetic paths 39 with a plurality of vehicles, one of which is represented as 10, each of which is equipped with a portion of a Vehicle Information and Safety Computer (VISC) system, namely that portion unique to the vehicle. Headquarters computer 1c also communicates by way of an interface 1i with a Public Switched Telephone Network (PSTN) 2. Headquarters computer 1c will ordinarily be co-located in the same building or complex as the fleet operational control center 3, but they may be separated by a continent if desired.

In FIG. 1, headquarters computer 1c is preferably a mainframe computer which performs pretrip navigation and route planning, and makes it available to the vehicle 10. During the trip, the headquarters computer 1c receives data from the vehicles 10, verifies that the vehicle is on schedule and on course, and evaluates other parameters, as more fully described below. The headquarters computer 1c performs distance and time estimates from the current location, fuel consumption evaluations, and by accessing data banks, advises the vehicle operator of the proximity of services such as rest, food andor fuel stops. Similarly, calculations can be performed to indicate when regulations require that the vehicle operator rest, and optimizes the route to gain the most distance toward the first destination before the next rest stop, given the location of the rest stop, and the anticipated time of arrival thereto. The headquarters computer 1c also monitors the condition of the vehicle, so as to anticipate, insofar as possible, the need for maintenance, and to avoid emergency stoppages. As described below, the vehicle operator does not have a separate cellular telephone (although such is not precluded), but instead communicates by way of a cellular system with the headquarters computer 1c, which, when a connection to the PSTN 2 is necessary, makes or "patches" the connections between the PSTN and the cellular receiver portion of the VISC system 11 which is carried in or on the vehicle 10.

Figure 2:
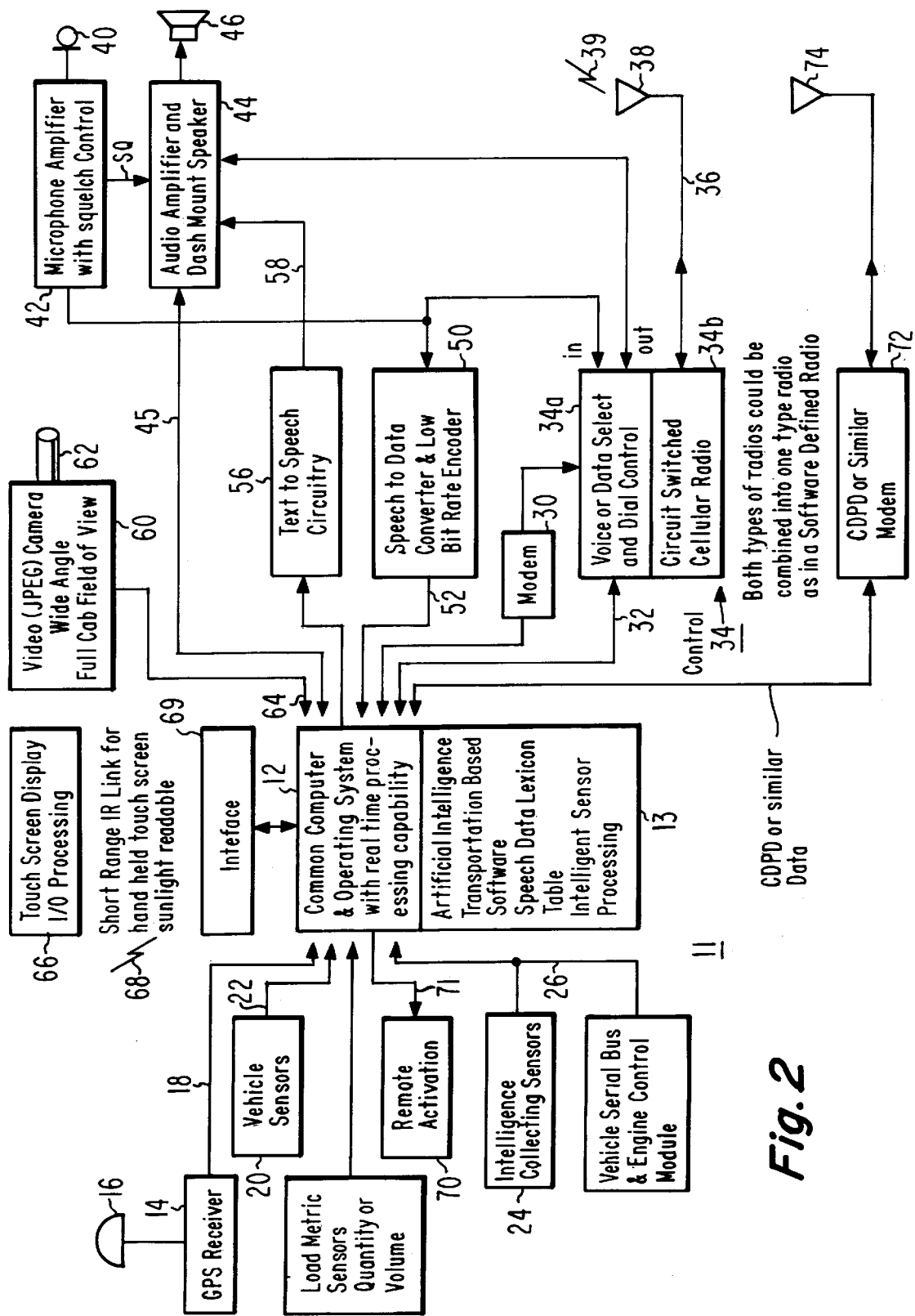
FIG. 2 is a simplified block diagram of the vehicle-mounted portion of a system according to an aspect of the invention.

Block 1i of FIG. 1 represents an interface between headquarters computer 1c and the public switched telephone network (PSTN), which provides near-real-time voice messages between any PSTN terminal telephone and the in-vehicle computer, which is described in greater detail in conjunction with FIG. 2. Near-real-time means there may be a small delay in voice signal propagation due to mobile IP voice packets being routed over a stochastic packet routed network. Telephone voice connections typically operate over a switched copper connection in real time. The IP voice packets can be interfaced to the telephone network at the voice or analog level. In the embodiment of FIG. 1, the mainframe computer 1c has electronic conversion circuitry for changing IP voice packets to analog voice, and the means to make and break a telephone connection. In emergency situations, the VISC will make an analog connection to the PSAP using 911 or other reserved emergency number. The VISC makes the 911 connection and can function as a bridge to connect a supervisor associated with Fleet Operations Control Center (FOCC) block 3 of FIG. 1 (described below) to the call in progress. Thereby both ends, namely the VISC and Server, can conference bridge voice calls.

Block 3 of FIG. 1 represents the functions performed at the Fleet Operational Control Center (FOCC), which is the "headquarters," referred to above, with which computer 1c is associated. The FOCC monitors emergency calls to the Public Service Answering Point (PSAP) 5, and initiates such calls if the situation appears to warrant such action. "Public Service Answering Point" is the formal name for 911 dispatch centers. It should be noted that the Public Safety Answering Points do not interface public or private networks with data terminals and will not accept a data messages. PSAPs require voice connection to the requesting customer. The FOCC may be involved in two-way voice conference calls-with the PSAP and the vehicle operator, in which the possibly superior knowledge of the headquarters personnel about the characteristics of the load may be valuable. As mentioned above, two-way voice or speech signals which is or are transmitted to or from the in-vehicle computer, which is described in more detail in conjunction with FIG. 2, are encoded for low data rate transmission. The FOCC also monitors the condition of the vehicle through video, voice, and sensor data, as may be required.

In FIG. 2, a vehicle 10 includes a portion of Vehicle Information & Safety Computer (VI&S) system 11, which portion includes a global positioning system receiver 14 and an associated antenna 16. Receiver 14 determines the location of the vehicle by monitoring signals generated by global positioning satellites, to produce signals representative of the vehicle location, which are coupled over a signal path 18 to a vehicle-mounted computer system 12 loaded with an operating system, which performs real-time calculations. The vehicle location information is useful if an emergency occurs and the vehicle operator (not illustrated in FIG. 2) is incapacitated, so that emergency vehicles can be directed to the location of the emergency. The vehicle location may also be useful in locating the vehicle if it should be stolen, or in verifying conformance to the route schedule.

A set of plural vehicle sensors is illustrated by a block 20 in FIG. 2, and together produce sensor signals which are applied over signal paths illustrated as 22 to the vehicle-mounted computer 12. The vehicle sensors are mounted on or about the vehicle body or chassis, and may include any or all of a plurality of sensors for producing signals representing shock and vibration along any one, two or all three possible axes of motion. The sensors of set 20 may include ordinary sensors which are common on vehicles, such as coolant andor oil temperature, oil pressure, and the like. Some of the sensors may indicate the shock and vibration to which the vehicle load is subjected, and may be of use in establishing that the shocks to which the load are subjected are within acceptable levels, which in turn may be used for selecting an alternative vehicle route if the shocks to which the load has already been subjected suggest that continuing on the previously chosen route may ultimately result in damage to the load. For example, ripe fruits bruise easily, and even when properly packaged, may be capable of withstanding only a certain amount of physical shock without damage. Other loads, as for example liquid petroleum products, may be much less susceptible to damage due to physical shock. Fruit and other perishable items may also be susceptible to spoilage if the temperature of the load-holding or cargo bay portion of the vehicle is not maintained above freezing or below some maximum temperature. The maximum temperature may even be a function of the length of time at which the maximum temperature is maintained before a lower temperature is restored; thus, some integral function of the load temperature may be a useful metric, and for measuring the temperature, the vehicle sensor block 20 may include temperature sensors for the cargo bay, the load, or even portions of the load, and possibly also for various important portions of the vehicle itself, such as the engine block and operator cab.

The vehicle-mounted or in-vehicle computer 12 of FIG. 2 is preferably of a common, and therefore inexpensive, type such as Versabus/Multibus, running a common operating system such as UNIX or DOS. The computer is preferably ruggedized for vehicular use. New designs such as the PC-104 bus standard adopted by the transportation industry are equally applicable, as they allow the use of common software applications and common adapter boards so that the basis of a VISC machine may be assembled with off the shelf hardware and software components.

In addition to vehicle sensors, the vehicle 10 of FIG. 2 may also include intelligence gathering sensors, illustrated together as a block 24. The intelligence collecting sensors provide a logical extension to the data available from the vehicle sensors represented by block 20, so that detailed information can be known about the operation and state of the vehicle, operator and load. In one aspect, the intelligence gathering sensors collect information about the operator of the vehicle. For example, in one aspect of the inventive system, if an unauthorized operator takes over operation of the vehicle, the system will warn the corporate fleet operations control center. The data from the intelligence sensors is mostly used by the operations center to help compute vehicle and operator efficiency, to warn of impending safety problems, and to summon assistance when necessary.

The signals produced by the intelligence gathering sensors of block 24 of FIG. 2 are applied to computer 12 by way of a signal path or paths illustrated as 26. The intelligence gathering sensors may include sensors which aid in performing very important load and operator safety checks by determining the identity of the vehicle driver or other operator, and by reporting to a central site any changes of operator status while on route, through the use of automatic processing associated with the sensors. More particularly, if the driver of the vehicle is not the driver who is authorized, the vehicle may have been stolen, the authorized operator may be injured, or the like, which may require that measures be taken to protect the authorized operator, the load, or both. When the sensors indicate an unauthorized operator change, entry to the cargo area or other measurable condition, the VISC 11 generates an emergency message which is transmitted to the FOCC either by way of the IP (CDPD) modem block 72 (and its antenna 74) or circuit switched cellular network block 34 and antenna 38. As an example of circuit switched data connection, signals to be transmitted are applied through a modem 30, together with control signals which are applied over a signal path 32, to a cellular radio 34, or its equivalent, which is capable of communicating by way of a signal path 36 and antenna 38 with the fleet operations control center. From there, the fleet administrator is in a position to actively monitor the vehicle, and, if necessary, send an emergency 911 call through the VISC, or to dial directly using the PSAP data base on the mainframe. As illustrated in FIG. 2, radio 34 includes a voice or data select and dialing control portion 34a and a circuit-switched cellular radio portion 34b.

The vehicle 10 is equipped with two distinct forms of communication, namely (a) mobile IP or CDPD (manifested as block 72 and antenna 74) and (b) circuit switched cellular (manifested as block 34 and antenna 38). It is expected that during normal operations of the system and the vehicle, only CDPD or its equivalent will be used, as it is a cost-effective way to transmit data in a mobile network. Connections are fast in CDPD because the connections are maintained continually, and no connect time is required after the initial connection. It is cost effective because cost is only incurred when data is transmitted or received, and the data transport charges are generally low. Compression software can be used to maximize transmission efficiency. In an emergency situation, CDPD would be used either alone, or in conjunction with circuit switched cellular. In some areas, circuit switched cellular may be the only available communications. The VISC system is expected to recognize such a situation and to enable the best or most appropriate communications operating mode.

The vehicle-mounted portion of the Vehicle Information & Safety Computer arrangement 11 of FIG. 2 also includes a microphone 40 which is mounted in the cab of the vehicle, at a location readily accessible to the operator. The microphone 40 is connected to a microphone amplifier 42, preferably with squelch control. The squelch control prevents the occurrence of oscillatory feedback when the microphone is activated during an interval in which a message is being received in the cab by way of audio amplifier 44 and dash-mounted speaker 46. Amplified speech produced at the output of amplifier 42 is applied over a signal path 48 to an input port of Voice or Data select block 34a and to a block 50. Block 50 represents a speech-to-data converter and low-bit-rate encoder, equivalent to a "vocoder," which uses various coding schemes to reduce the data rate of a digitized speech signal.

Low bit rate digital speech vocoder technology is mature. There are several types of low bit rate algorithms available from suppliers. As an example, two low bit rate speech compression systems are commercially available from Digital Voice Systems of Burlington, Mass. These two systems use the Improved Multi-Band Excitation and the Advanced Multi-Band Excitation speech compression algorithms. These algorithms are superior to many others when used in a high background noise environment such as may occur in commercial aircraft telephony. Calian Communications Systems Ltd., of Kanata Ontario Canada also provides low bit rate speech encoders which run at 2.4 kbps in the VM200 voice module. At a 2.4 kbps burst data rate, speech fits quite nicely into a CDPD data stream or into a 14.4 kbps circuit switched cellular data stream.

The encoded speech signals produced by converter block 50 of FIG. 2 in response to speech input from microphone 40 and amplifier 42 are applied over a signal path 52 to computer 12. The speech signals produced by microphone amplifier block 42 and applied to an input port of block 34a also assist the cellular radio 34 in converting from voice to data or data to voice for transmission. When encoded speech signals are received by antenna 38 and cellular radio 34b, the codes are coupled through the data select portion of block 34a and modem 30 to computer 12. Computer 12 processes the signals in a manner which tends to produce digitized speech signals which mimic or replicate the original speech as closely as the encoding and decoding algorithms allow. The resulting speech-representative signals are routed in any appropriate manner, as by a signal path 45, to amplifier 44 and speaker 46.

A block 13 of FIG. 2 represents various portions of the software which may be used in conjunction with computer 12, such as artificial intelligence transportation-based software, speech-to-data andor data-to-speech lexicon, and other signal processing which may be termed "intelligent." to indicate that it performs sophisticated analyses, some of which are described below.

In order to avoid having the vehicle operator take his eyes from the road, controls, or other important view, at least a portion of the data which is transmitted to the vehicle for his use may be converted into synthetic voice. For this purpose, the arrangement of FIG. 2 includes a text-to-speech converter 56, which performs the desired conversion from text data to synthetic speech. The synthetic speech signals are applied from block 56 by way of a data path 58 to audio amplifier 44 and dash-mount speaker 46.

The arrangement of FIG. 2 further includes a block 60, which represents a video camera or multiple cameras with a wide-angle capability or lens 62. The purpose of camera 62 is to provide signals representing a view of the vehicle operator, which can be analyzed or compared with a reference, in order to verify that the person seated at the operator's location is the authorized operator. The signals produced by camera 60 are applied over a signal path 64 to computer 12.

Computer 12 of FIG. 2, together with the remote computer 1c at the company headquarters, perform all of the processing which is required to evaluate the signals and make the determinations required for the invention. At the present state of the art, a computer which is located on the vehicle might not be able to do all of the required processing, and it is contemplated that the remote computer ic would perform all of the more difficult "number crunching" which might be required. In this situation, the data paths between the vehicle and the headquarters must carry some "raw" or less-processed data. However, it should be understood that this limitation may not apply in the future, and that it may be possible in the future to do more and more of the processing at the vehicle, and to transmit only results and conclusions back to the headquarters. Transmission over the data paths of only conclusions, rather than raw or partially processed data, would in turn advantageously reduce the bandwidth requirements imposed on the radio transmission system.

Thus, in the described embodiment, which is predicated on the expectation that the in-vehicle computer will not be able to perform all of the complex processing tasks, the in-vehicle computer or unit may be thought of as a sophisticated I/O device for the central computer or server. The in-vehicle computer is consequently not like a client in a client server technology, nor is it a dumb terminal. It is an intelligent I/O communications device equipped with sensors for data collection. The in-vehicle unit is not, in this preferred embodiment, capable by itself of performing all of the described functions.

The computer 12 of FIG. 2 may be hard-wired to the data display, but having the data display at a fixed location, as on the dashboard, may require the vehicle operator to glance at the dashboard-mounted display, or to look at it for protracted periods. Such a requirement for observation of a fixed-location display may be a safety hazard. According to an aspect of the invention, a display or display/input-device is hand-held, and therefore movable so that it may be observed at the optimal distance for readability by the operator, under the most convenient conditions for safety. For this purpose, the hand-held display & keyboard 66 is interfaced with the computer 12 by means of a remote or two-way signal path. In the illustrated embodiment, the interconnection between the display 66 and the computer includes an infrared (IR) link 40 68 and an interface block 69. Such links are well known in the art. In order to accommodate various positions which the display might take when in use by various different vehicle operators, there should be some way to make the link somewhat independent of physical position and orientation. This could be accomplished in the case of an infrared link by utilization of a number of different transducers at different locations throughout the cab of the vehicle, with their beams oriented in various directions.

Block 70 of FIG. 2 represents some vehicle function, such as the headlight control, which is remotely controllable over a signal path 71 by the computer 12. With such control, the headlights could be switched to the ON state by the computer 12 itself, if it were to sense that the ambient light had been reduced below a given level, or the flashers could be switched to the ON state if the vehicle speed were to drop below a given level. Similarly, the headlights could be turned ON or flashed on supervisor command by the headquarters computer 1c, in the event of a stolen vehicle or accident occurring at any time, so as to make the vehicle readily visible to rescue personnel. The supervisor may also be in communications through the VISC bridging feature with the local PSAP and thus facilitate coordination.

Block 72 of FIG. 2 represents a network interface point, or its equivalent. A network interface point is also called a Network Interface Card (NIC) or CDPD modem. Such an NIC or CDPD is an arrangement by which data can be transmitted over a cellular system so that it appears to the vehicle-mounted VISC computer 12 that it is locally attached to a local area network (LAN) and its protocols, as opposed to being attached to a point-to-point circuit using switched IP protocols such as Point-To-Point-Protocol (PPP) or Serial Line Interface Protocol (SLIP). It is anticipated that most communications between the vehicle 10 and the headquarters computer 1c (FIG. 1) will be accomplished by data traversing modem 72 and antenna 74. It is also expected that the functions of cellular radios 34 and 72 can be combined into one unit, such as a Software Defined Radio, which could then use a single antenna, rather than two antennas such as the illustrated antennas 38 and 74.

Figure 3:
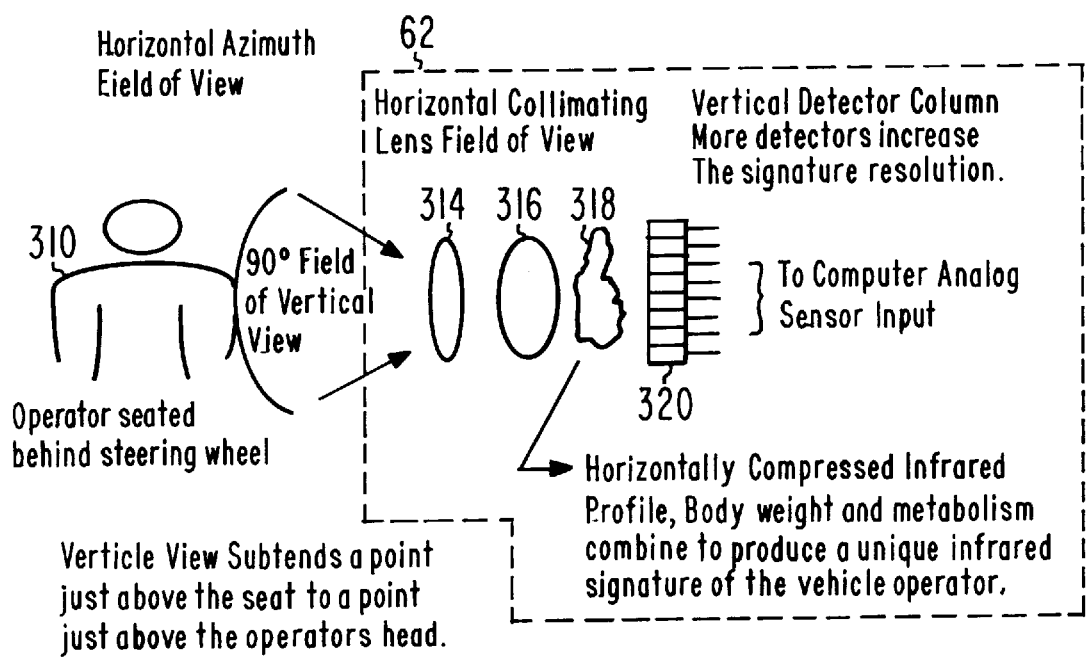
FIG. 3 is a simplified representation of an operator infrared profile identification arrangement, which may be one of the information sensors or "intelligent sensor array" components associated with the system of FIG. 2.

FIG. 3 is a simplified representation of an operator infrared profile identification arrangement, which may be one of the information sensors or "intelligent sensor array" components associated with the system of FIG. 2. In general, the operator infrared profile sensor of FIG. 3 measures the infrared signature of the driver. The infrared profile sensor may be connected using a vehicle serial bus described below, or through a discrete analog-to-digital converter (ADC). In its most basic form, the infrared profile sensor data is used to indicate the presence of the authorized operator in the driver's seat. Through basic signal analysis and association with other data, the sensor can be used to indicate when an unauthorized driver has taken position. This computation can be performed at the main computer from partially processed data sent over the IP network. When the "unauthorized driver" condition is detected by use of the infrared profile, the condition can be double-checked with other sensor arrangements, such as the driver's seat pressure indication system described in conjunction with FIG. 4. The double-check can also be accomplished with basic speech analysis and identification software in the artificial intelligence software. Basic speech analysis can be done in the vehicle-mounted computer portion 12 of the VISC 11, or the speech can be sent in the form of raw sampled data to the mainframe. Since only a sample is taken, the bandwidth requirement is not large. The speech would be processed by linear analog-to-digital conversion to maintain all characteristics. The economics of additional circuitry in the VISC to perform this function would have to be weighed against the additional transmission bandwidth usage to determine the most economical point for analysis processing. It appears that the advent of more capable integrated circuits may make it possible to perform all of the speech analysis functions, including the requisite analog-to-digital conversion of speech, on-board the vehicle, rather than performing some of the speech analysis functions at the main computer.

As a further cross-check to verify the identity of the current vehicle operator, the text-to-speech circuitry can be used to issue a question to the operator, to which a code word reply is required as the proper response. If the code word is not given within a certain time, the on-board computer causes a message can be sent to the Fleet Operations Control Center indicating the lack of appropriate response, from which the presence of an unauthorized driver can be inferred.

In FIG. 3, the operator sitting behind the steering wheel of vehicle 10 is illustrated as 310. An infrared sensor 60, having an infrared lens system 314, 316 produces a wide vertical field of view, which may be horizontally compressed In the preferred embodiment, the horizontal field of view is sufficient to sense past the width of the seat, and thus may be approximately 900. The sensor 60 is, ideally, mounted so as to have an unobstructed view of the vehicle operator, as for example by being mounted at the center of the end of the steering post, centered on the steering wheel. In such a position, the operator is seen in bust view by the sensor 60. As illustrated in FIG. 3, the vertical field of view is illustrated as 90°. In FIG. 3, the infrared image generated by the lens system 314, 316 in response to the presence of vehicle operator 310 is illustrated as a shape 318. The vertical intensity profile of shape 318 will be related to the infrared signature of the vehicle operator. Note that the number of sensor segments determines the quality of differentiation. A larger number of segments will produce a higher quality sample. In the FIGURE, a single column of 8 segments is depicted, but any sufficient segment arrangement is good, such as one or more columns of multiple segments. These signatures are expected to be sufficiently different from one person to the next so that the infrared spectrum or profile can be used to identify the presence of the authorized operator by contrast with some other party. A column detector 320 is located to sense the profile 318, for generating a vertically-quantized set of signals in response to the profile. The in-vehicle computer 12 of FIG. 1 can process the profile by comparing it with a pre-stored profile of the authorized operator, or the profile data taken from the column detector can be periodically transmitted over the system 4 of FIG. 1 to the headquarters computer for verification.

Figure 4:
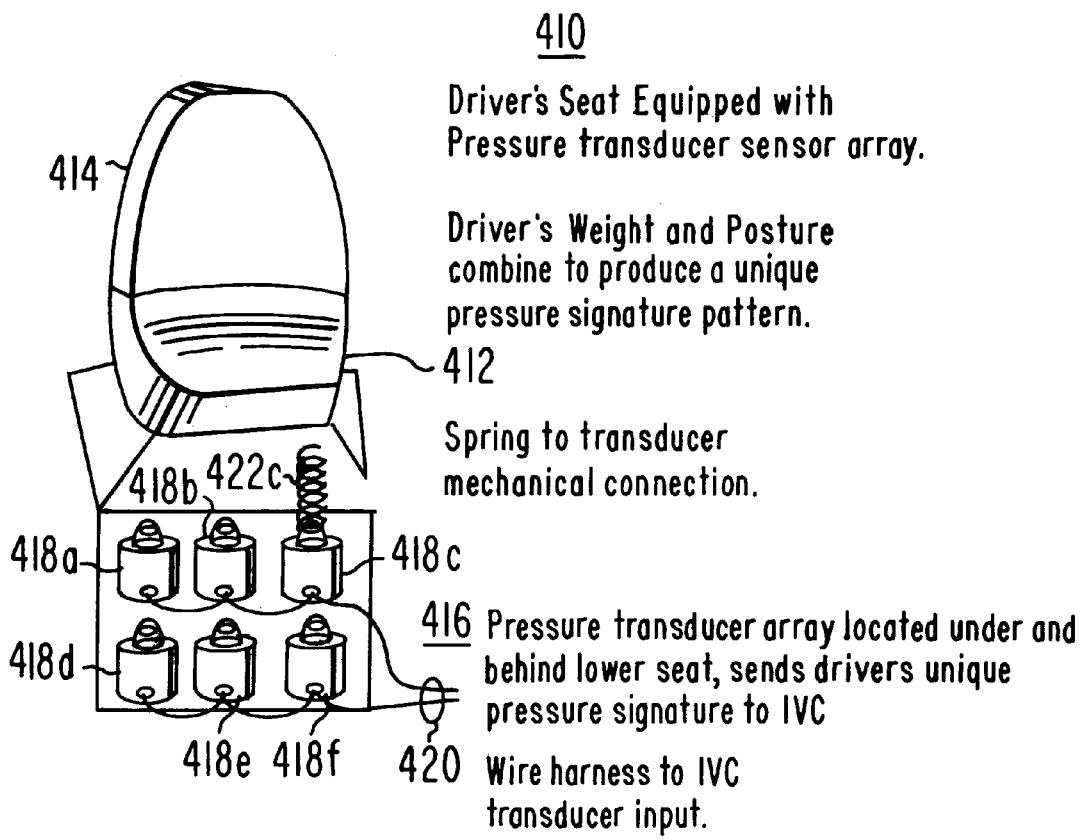
FIG. 4 is a simplified representation of another intelligent sensor array component which may be used in the intelligence collecting sensor block of FIG. 2.

FIG. 4 is a simplified representation of another intelligent sensor array component, which may be used in the intelligence collecting sensor block 24 of FIG. 2. In FIG. 4, the vehicle driver's or operators seat is illustrated generally as 410, with the seat portion designated as 412 and the back designated as 414. A set 416 of pressure transducers, illustrated as being six in number, includes individual pressure transducers 418a, 418b, 418c, 418d, 418e, and 418f. The transducers of set 416 are connected to a wire harness 420, which is connected to appropriate input ports of the in-vehicle computer 12 of FIG. 2. The wire harness may include a plurality of parallel signal paths, one for each sensor, or preferably the number of wires to be routed is minimized by the use of a multiplexer with each sensor, and a common serial bus (illustrated as 701 of FIG. 7) interconnecting all of the sensors with the in-vehicle computer 12. The pressure transducers of array 416 are placed at locations under the seat 412 and behind the back 414, and each sensor is connected to the seat or back (as appropriate) by means of a spring arrangement. One coupling spring, which is illustrated as 422c, is coupled to sensor 418c in FIG. 4. The springs provide support for the seat and back, while coupling the pressure placed on the particular seat and back locations to the associated pressure sensor of set 416. With such an arrangement, the driver's unique posture and morphology (physical shape) create a pattern of pressure which is likely to differ from that of another person. The use of an intelligent driver's seat sensor such as that of FIG. 4, when used in conjunction with other sensors such as the infrared sensor described in conjunction with FIG. 2 allows the presence of the authorized operator to be verified with greater certainty than would be the case when using one sensor alone.

Figure 5:
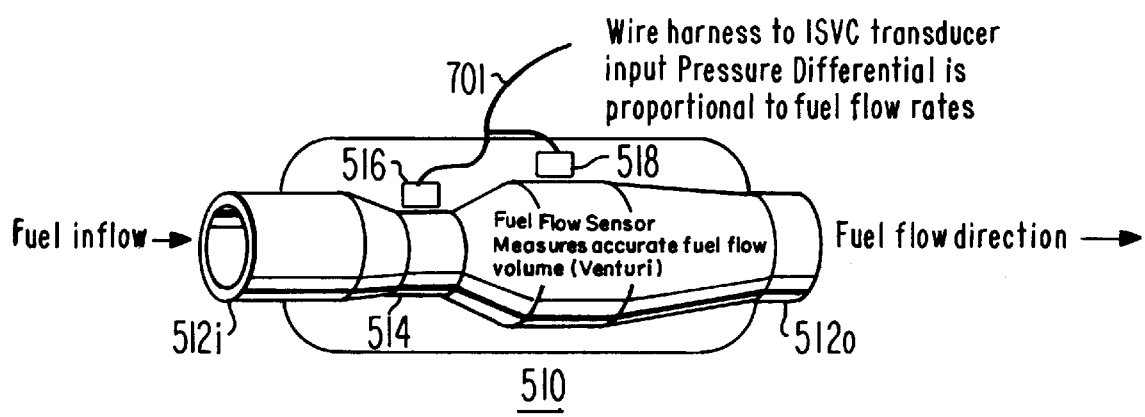
FIG. 5 is a simplified representation of a fuel flow sensor component which may be used in the vehicle sensor block of the arrangement of FIG. 1.

Another intelligent sensor array component, which may be a part of block 24 of FIG. 2, is the fuel flow sensor 510 of FIG. 5. The fuel flow sensor might be considered to be a part of the vehicle sensor set 20 of FIG. 2, but it is deemed to be among the intelligent sensors because its sensed values are used in conjunction with other values to generate other useful information, such as fuel mileage and condition of the vehicle. The fuel flow sensor 510 of FIG. 5 includes pipe input port 512i and a corresponding output port 512o. A pipe including a smoothly narrowed portion or Venturi 514 connects ports 512i and 512o, so that fuel flowing from input port 512i to output port 512o must pass through the constriction 514. As known, flow through the constriction reduces the fluid pressure at the constriction. A pair of pressure sensors 516, 518 senses the pressure at the constricted location and at an unconstricted location, and the resulting sensed signals are coupled over a wiring harness, illustrated as serial bus 701, to the in-vehicle computer 12 of FIG. 1. The computer determines the difference between the two pressures within the fuel flow sensor 510, and determines the instantaneous fuel flow rate. The flow rate, in conjunction with information relating to the rotation of the wheels of the vehicle, can produce an indication of the fuel mileage. The fuel flow rate, in turn, in conjunction with information from the axle load sensor may indicate that air filters need replacing before the scheduled change. As another example, if the vehicle sensors indicate that the vehicle is operating on level road, and the fuel flow rate is less than average, this might be an indication that tire inflation need checking. The axle load sensor can be used to indicate a change of grade if sampled at appropriate intervals. If the sensor set includes tire pressure sensors, and the fuel. flow rate is above average on a level grade, but the tires are not low, this might be taken as an indication of some other condition of the vehicle which might warrant further investigation.

Figure 6:
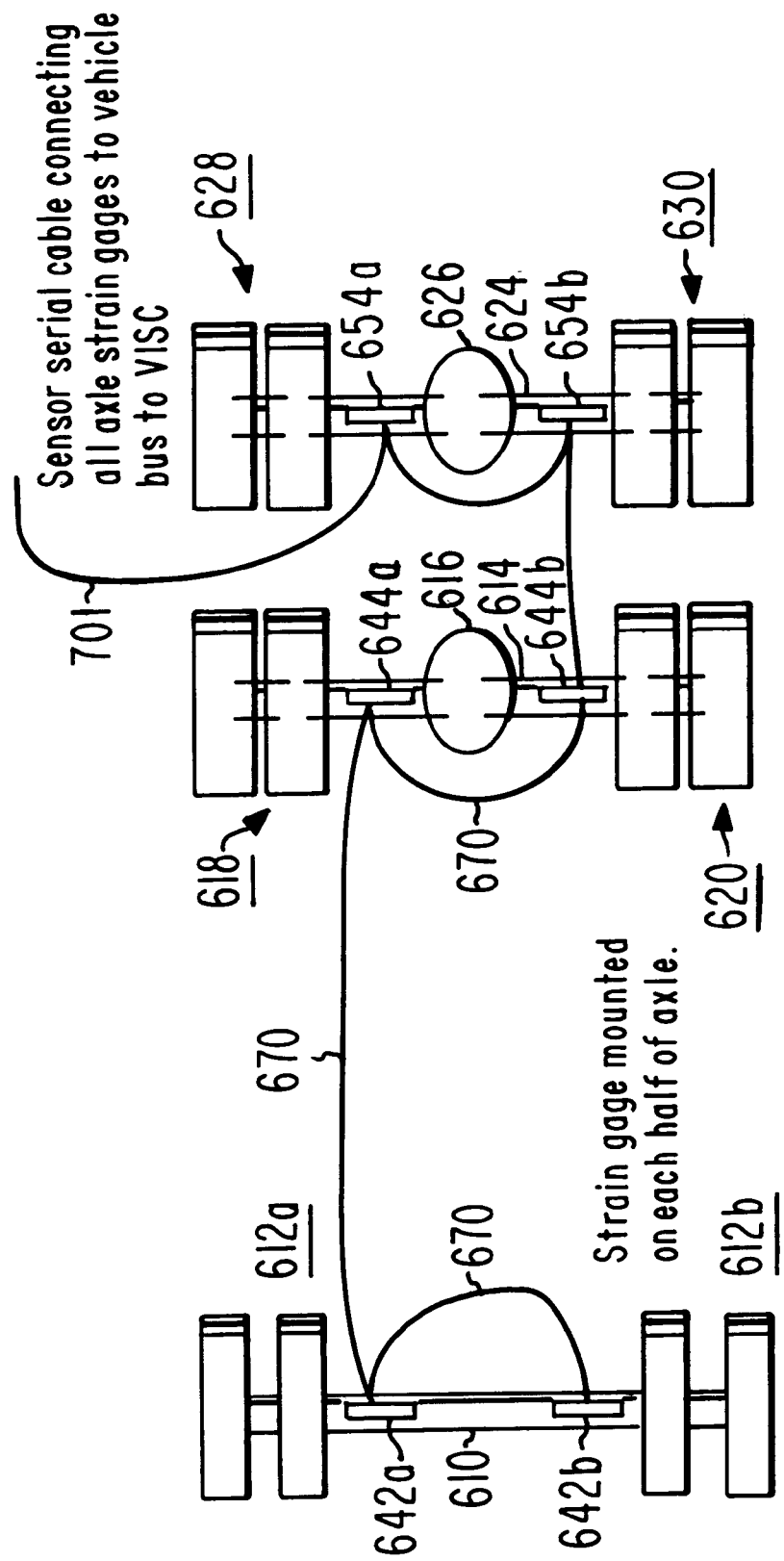
FIG. 6 is a simplified representation of the axles and wheels of a cargo vehicle.

FIG. 6 is a simplified representation of the axles and wheels of a cargo vehicle, which may be vehicle 10 of FIGS. 1 or 2. The sensor arrangement of FIG. 6, in conjunction with the remainder of the VISC system, provides the function of detecting shifting load conditions, and warning the vehicle operator of the condition, before the shift is so significant as to cause and accident. A second function may be to project the vehicle centroid, and to alert the operator when the speed is too high for stable operation in a turn. A third function may be to sense the grade of the road and use this data with fuel flow data to compute most economical speed. Ideally, the location, speed and direction of the vehicle are known to the VISC system, as is the intended route, so the system can alert the operator when his speed exceeds a safe speed for any curve, regardless of the centroid, but also provides centroid monitoring, and takes the centroid into account when determining a safe speed. A fourth function of the cargo load sensor may be to detect the weight of cargo load and report any unauthorized changes of cargo weight back to the fleet operations center. Essentially the strain gage arrangement, sample rate, and processing algorithms can indicate much about the grade position, vehicle dynamics and operation of the vehicle.

In FIG. 6, a front axle is illustrated as 610, and the associated left and right wheels are designated as 612a and 612b, respectively. Two rear axles are illustrated, namely 614 and 624, each of which is associated with a differential gearbox 616 and 626, respectively. The right and left rear wheel sets associated with axle 614 are 618, 620, respectively, and the right and left rear wheel sets associated with axle 624 are 628 and 630, respectively. According to an aspect of the invention, each axle bears a load pressure sensor, which in the particular embodiment of FIG. 6 are strain gauge sensors. The strain gauge sensors mounted on front axle 610 are illustrated as 642a and 642b, with sensor 642a mounted near that end of axle 610 which is adjacent to wheel 612a, and sensor 642b, which is mounted near the end of axle 610 which is adjacent to wheel 612*b*. The mounting location for the strain sensors on each side of the axle is selected to be that location at which the axle strain is maximum, or some location which is otherwise advantageous for the measurement of axle strain displacement. This mounting location is termed 'optimal" herein. The strain gauge sensors illustrated as being mounted on axle 614 are designated as 644*a* and 644*b*, and are likewise optimally mounted on the axle adjacent to the wheel having the same alphabetic suffix. The strain gauge sensors illustrated as being mounted on axle 624 are designated as 654*a* and 654*b*, and the sensors are optimally mounted on the axle. The load pressure gauges report the vehicle load which they sense to the in-vehicle computer (12 of FIG. 1) by way of a sensor serial cable 701 connected to the set of strain gauges, which can determine the load distribution, as well as dynamic data which can be processed to produce center-of-gravity information. This center-of-gravity information, in turn, can be processed as an ongoing histogram with average and mean continuously extracted as the trip progresses. A deviation from the long-term average and mean, a shifting load may be inferred, and an early indication of a shifting load or excessive speed can be provided to the driver first, and if conditions persist, a similar warning can be sent to the supervisor by the VISC. The exact parameters for persist time can be dynamically set by the mainframe under supervisor control. On curves, the dynamic data can also provide an advance tipping condition warning, which can be readily sensed by monitoring the net load on each side of the vehicle. When the load on one side of the vehicle changes with respect to a computed reference level, it may be inferred that tipping is imminent, and an alarm may be sounded. Again, the mainframe has the resources to make the assessment and download the reference level to the VISC. Another example of the use of Axle Load Pressure Strain Gage Sensors is to sense a change of total vehicle weight at a location which is not a designated off-loading point may indicate an unauthorized unloading of the vehicle, and this information, when reported back to the headquarters, may invoke closer scrutiny, and corrective action if necessary.

In addition to the intelligent axle sensors as described other type sensors may be affixed to the cargo directly or mounted in the cargo bay of the vehicle and connected to the VISC. These sensors may be accelerometers or similar, to provide continuous indications of the forces and conditions to which the load is subjected, temperature sensors, humidity sensors, and door alarm sensors to provide an indication of the situation and report changes as appropriate.

Figure 7:
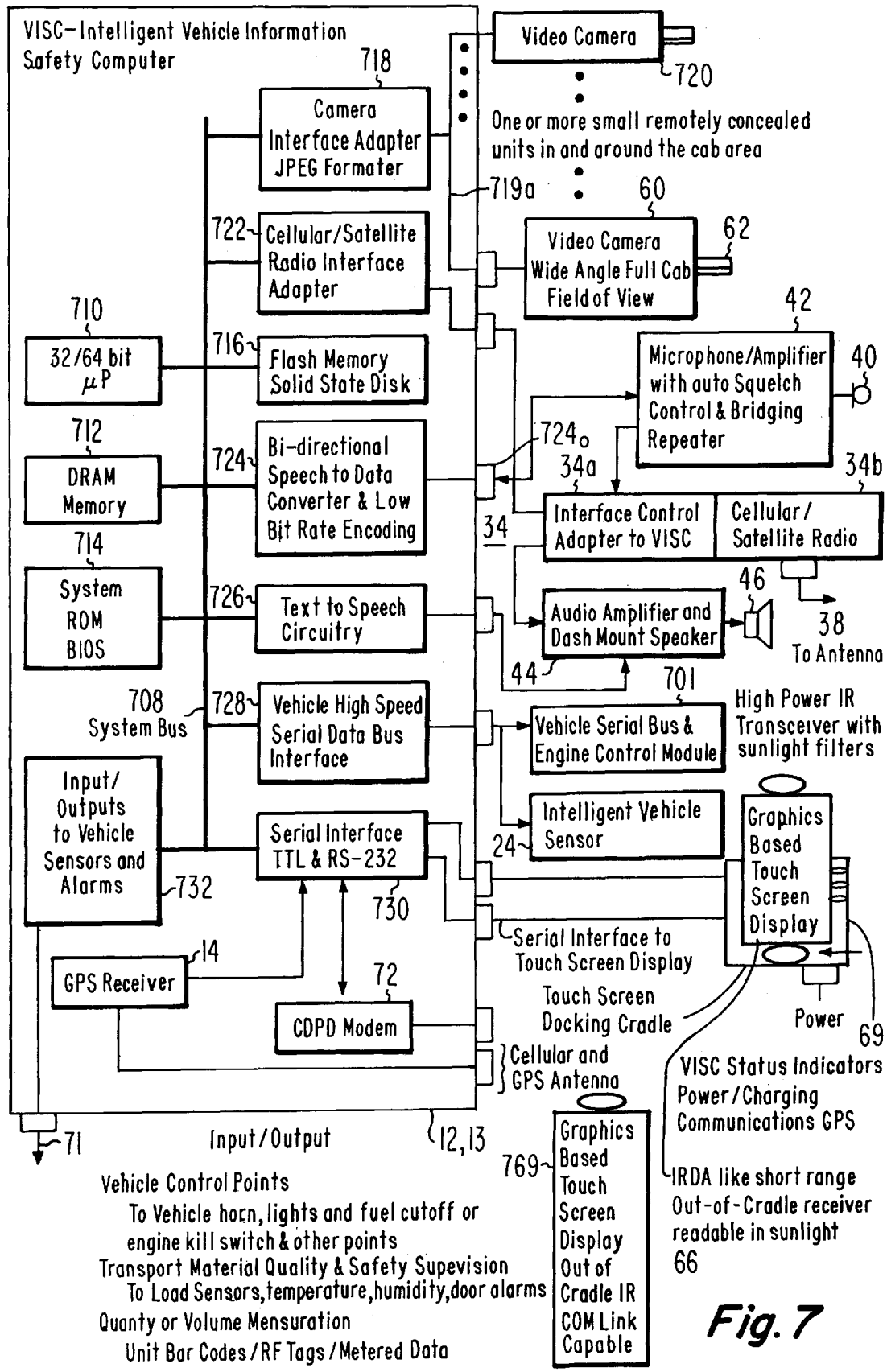
FIG. 7 is a simplified representation of the architecture of the in-vehicle portion of the system of FIG. 1.

FIG. 7 is a simplified representation of the architecture of the in-vehicle portion of the system of FIG. 1. Elements of FIG. 7 corresponding to those of FIG. 2 are designated by like reference numerals. In FIG. 7, the in-vehicle computer 12, together with the program portions 13, include an internal bus 708 communicating with a 32/64 bit microprocessor (μP) 710, DRAM memory 712, system BIOS ROM 714, The computer 12,13 may also include a flash memory (a nonvolatile solid-state memory) 716 which performs the same function as a rotary disk drive, but which is much more reliable in a vehicular context. Computer 12,13 also includes a camera interface adapter and JPEG formatter illustrated as a block 718, which communicates by way of a signal path 719*a* with video camera 60 (FIG. 2). The camera interface adapter may also be arranged to communicate by way of other signal paths, one of which is illustrated as 719*b*, with other video sources, such as conventional cameras placed about the cab, the cargo bay, andor the exterior of the vehicle. Such additional cameras could be concealed, to provide video associated with various portions of the vehicle, and especially of the cargo door. The camera associated with the camera door is illustrated as 720 in FIG. 7. The video or images provided by camera can be made a part of the record of delivery of loads or of partial loads, to aid in verification. While the illustrated connections of the additional cameras are hard-wired, they may instead be radio or like connections for the concealed cameras.

Block 722 of FIG. 7 represents an interface adapter between the in-vehicle computer 12, 13 and the cellular or satellite radio illustrated as 34. Block 724 represents a speech-to-data converter with low-rate encoding, corresponding to a vocoder transmitter. Block 724 receives speech from amplifier 42, and digitizes it if necessary, then performs low data rate speech encoding and such error protection as may be appropriate, and makes the encoded and speech data available to the computer. The low data rate voice is desirable in view of the anticipated reliance on the CDPD data communications link for most communications between the vehicle and the headquarters computer and fleet operational control center. Since the low data rate voice made available to the computer is encoded according to the particular algorithms selected for the purpose, the ability to understand the speech depends upon use of a corresponding decoder at the receiving end of the signal path. Consequently, the digitized, reduced-data-rate voice component of the data transmitted from the computer 12,13 of FIG. 7 over the communications link which uses the CDPD modem 72 and antenna 74 (FIG. 2) can only be understood if it is decoded with a corresponding algorithm. For this purpose, the voice component of the data signals received at the headquarters computer 1*c* of FIG. 1 and communicated to fleet operational control center 3 must be decoded before use. In the event of an emergency 911 call in which the vehicle operator is patched to the 911 operator, the administrator at the corporate fleet operations control center can record and monitor the progress of the 911 call, and conference in as required. In this situation the VISC acts as bridge repeater performing conversion of IP voice to analog and bridging in the operator to the PSAP.

Similarly, reduced-rate-encoded voice communications directed from the headquarters to the vehicle and received by way of CDPD modem 72 of FIG. 7 must be decoded, and converted into appropriate speech signals. The decoding of the data signals to produce voice signals is performed in block 726 of FIG. 7, so this block performs a function equivalent to the function of a vocoder receiver. It should be noted that, in order for the headquarters to initiate a 911 call from the circuit switched cellular radio 34 of FIGS. 2 and 7, the headquarters must be able to transmit voice to the vehicle, and patch it to the circuit-switched cellular radio. Since the circuit-switched cellular radio is already in use for communicating between the vehicle and the PSAP, there must be a second communication path between the vehicle and the headquarters. This additional path is the reduced-data-rate voice transmission over the CDPD network. Thus, this function depends upon having two separate communication paths, which can be patched under remote control.

Another possible use of the block 726 of FIG. 7 is that of converting text-based data (not low-rate encoded speech data) into speech. This is the equivalent of the text readers which have been used to aid the blind to use monitor displays in computer-based systems. Using this additional mode of operation, the vehicle operator may be made aware of data without having to look at a monitor or display, which might otherwise require him to stop driving to receive the information.

The administrator at the corporate fleet control center has control over the text-to-speech circuitry in block 726 of FIG. 7, and can, upon appropriate command, interject voice in the form of synthesized speech to the amplifier 44 and speaker 46. In essence, the administrator can open a near-real-time voice channel to the driver. The administrator also can send voice to the PSAP when appropriate, by using the VISC control to the cellular radio.

The text-to-speech circuitry of block 726 of FIG. 7 may be driven by an intelligent speech rules table which is created on the main and download through the data network (4 of FIG. 1) to the entire fleet of vehicles, including vehicle 10. This downloading is provided so that a common speech interface presents itself through out the fleet, in the form of a table. Rules for the VISC to take action or compute based on speech come from this table. FIG. 8 is an example of such a table. The table of FIG. 8 is called a Noun, Verb and Actions Table. In FIG. 8, the first of the three columns, entitled "Computer/Operator Recognized Noun or Phrase" represents objects, the second column is entitled Computer/Operator Recognized Verb or Action," and represents actions to be taken, and the third column is entitled "Data Text-to-Speech Transaction Description and Action Taken," and represents the result of the combination or concatenation of a word taken from the first column and from the second column. The first column of the table of FIG. 8 represents objects to which the commands appearing in the second column are applied. The VISC will perform an action based on recognizing a verb. For example the verb to "OPEN" as in "OPEN a channel to the supervisor" for near-real-time-aural communications. A second example might be "LOG" as in "LOG transaction ""transaction to be logged is spoken here"" END LOG" and the spoken data will be appended to the data base. The table of FIG. 8, or its equivalent, is operated and maintained by the mainframe and downloaded to VISC units. These become the list of spoken allowable actions which the vehicle operator can take with respect to the system.

The text-to-speech circuitry of block 726 of FIG. 7 connects to the audio amplifier 44 and to the cab speaker 46. Likewise, the cellular radio also connects to the audio amplifier and speaker under computer control. Audio signals cannot go to the audio amplifier and speaker without an enabling control from the computer. The speech-to-data converter receives audio from the microphone amplifier. The audio amplifier supplies the microphone amplifier with a squelch signal.

The data bi-directional text-to-speech circuitry associated with block 56 of FIG. 1 is a useful part of VISC system. A well-defined transportation computer recognizable speech and data structure, with nouns and verbs, is made a part of the VISC and main computer library. FIG. 8 illustrates one embodiment of a portion of a language which could be constructed and used in a bi-directional automated speech-to-text computer. It includes defined nouns which are software objects and verbs which are verbal actions and the intended performed functions. As in any well defined language, the verb implies action to the noun. This language and data structure enables the interaction of the vehicle operator with the VISC and the central computer using voice. Text-to-speech is well known in the art, and is implemented in telephone switches in which an inquiry as to a telephone number transfers the caller to a text-to-speech converter which produces speech sounds representing the desired number. In the present application the use of text-to-speech provides a useful function, in that the scope of the intended actions can include the opening and closing of communication links, the sending of messages, annotation of logs, and other functions such as the turning on and off of vehicle accessory such as alarm systems which would require a vocalized security code. This aspect of the invention brings together voice recognition technology, text-to-speech technology, and rule based software processing to bring artificial intelligence to the transportation industry. As one example, when the vehicle operator makes a delivery, the operator gives a voice command to the VISC to "Log delivery xxxxx completed" where xxxxx is the item identification number. Upon this command, the VISC tags the GPS location to the message and sends a log transaction report to the main computer. The appended GPS message, in the presence of vocal security code, confirms the presence of the operator at the customers facility and the time of delivery. If a bar-code scanner is provided to the operator and the load includes bar-coded items, the bar-code information could also be appended to the log message, to thereby provide more positive identification of the delivered load. Ideally, the bar-code scanner would be incorporated into the hand-held display/input device (66 of FIG. 7) Another example of the use of a speech-to-text converter is a verbal request by the operator to open a voice channel to the operations center. The VISC would be programmed to dial the corporate operations center in response to such a command. A voice command could also be used to initiate a call the 911 emergency center. The advantage of this approach is that the operator can perform a voice log while underway without distraction to vehicle operation.

Touch-tone like signals from the speech-to-data converter 724 of FIG. 7 could be used to access the interface control adapter 34*a* for the cellular radio 34. These tones could be out-of-band tones above the 3.5 kHz upper voice pass-band filter in the cellular radio control adapter. They act as toggle switches so that source selection is possible and voice channel mixing is on or off. Thus, if the operator enunciates a number to "DIAL" through the mainframe-to-telephone network interface then he would have access to the connection; this could possibly be used in a call home to let someone know the operator's estimated time of arrival.

Block 728 of FIG. 7 represents an interface between computer bus 708 and the high-speed serial data bus 701, discussed above. Block 730 represents a serial interface, which may include a TTL interface and a standard RS-232 interface, to the holder/charger 69*hc* which serves hand-held display & input device 66. The two-way wireless path between the holder/charger 69*hc* and the display & input device 66 may be a short-range Infrared (IR) link using appropriate devices such as solid state lasers to function in a sunlight environment, it could also be a short range RF link. The laser IR embodiment is shown in FIG. 7. Block 769 of FIG. 7 represents the hand-held display & input device 66 removed from its holder/charger 69, and operating on internal batteries.

In FIG. 7, block 701 is a VISC-Data-Bus-to-Vehicle-Serial-Bus adapter or converter. The Vehicle Serial Bus is the Engine Control Module interface. It connects the dashboard devices to the vehicle components such as fuel tank, coolant system, engine oil sensors, and vehicle emission controls. This is preferably the same kind of bus that an automotive technician connects into with diagnostic equipment in order to read a vehicle diagnosis to determine what is wrong with the vehicle. Block 701 is the typical discrete interface common in computer systems. Mostly it consists of form C relay contact closures. A high voltage, typically 5 or 12 volts is put on a resistor divider network such that an open circuit relay allows high voltage across the divider. This high voltage is sensed by the computer and represents a condition. When the relay is closed, the divider circuit is changed so that a ground connection lowers the voltage sense point close to ground level and the computer sees a low voltage and interprets the second condition. Form C contact closures are used to detect conditions such as headlights on, door open alarm, and engine alarms (oil, temp). These alarms may be available directly from the dashboard console through the vehicle serial bus interface to the engine control module. The vehicle conditions these alarms represent are necessary for the operator and also for the operations center. They are collected, processed and sent on to the mainframe. The vehicle odometer and speedometer are part of the vehicle sensor interface and should be available through the vehicle serial bus. In an older vehicle this data, though not available, may still be collected through the addition of more interface devices. Typically they are not form C but require pulse or counter sensors. A voltage pulse is generated when the odometer cable completes a revolution. This pulse is counted on a unit time scale. More pulses per unit time indicate a higher speed. The pulse signal must be calibrated to the computer for accurate vehicle speed. A fixed number of pulses indicates a unit distance driven. This value must also be calibrated to the computer. Once speed and odometer are calibrated, they remain accurate when used with GPS data to compute distance driven, time elapsed and speed computed. Note that GPS also computes velocity and distance traveled. The two data are merged to improve data reliability.

FIGS. 9a and 9b together constitute a simplified flow chart or diagram illustrating a method in accordance with an aspect of the invention. In FIG. 9a, block 910 represents creation, in response to a request, pulling together information required to process the request, by, for example, identifying an available truck capable of carrying the desired load over the desired path. Some of this decision-making may be performed by a human, as known in the art. From block 910, the logic flows to a block 912, which represents collection of other information, such as characteristics of the shipping and delivery customers (hours of operation, for example), characteristics of the available routes between the pick-up and destination points, and the like. Blocks 914 represents the route preplanning step. Route planning is a well-known process, which may be done in many different ways. The resulting candidate routes are downloaded to the vehicle operator (block 916), who may select one of the proposed routes, and selects one (or none, if he happens to be scheduled for vacation on the day in question). The selected route provides information is supplied to the shipper and to the delivery customers, so that they may be able to plan therefor. Block 918 verifies to the vehicle operator that the selected route is in place. Block 920 of FIG. 9a represents route data collection functions. More particularly, block 920 represents collection of such data as time from start, vehicle location, route deviations, fuel remaining, sensor values, and updating of customer hours of operation, all of which are reported to the central server. Block 922 represents determination of any specialized load management measurements which may be required in view of the load, such as the load temperature profile, which may require load temperature sensor measurements every few minutes. Block 924 represents collection of data specific to pickup or delivery, such as identity of the shipping party and the delivery party, the amount of goods on- and off-loaded, and the like.

From block 924 of FIG. 9a, the logic flows to block 926 of FIG. 9b. Block 926 represents measurements, such as monitoring of road shock, load temperature, or the like, as determined in block 922. Block 928 represents represents analysis of the data collected in block 922, to determine the quality of the transport. In other words, a measure is calculated comparing the transport conditions with ideal transport conditions, to provide a measure of quality. This measure of quality can be provided to the customers, as an indication of the quality of the services provided. Block 930 represents management of operator performance, as measured by factors such as miles per unit time, number of stops, amount of fuel consumption, and others. In those situations in which an on-board camera can be directed toward the road, evaluation can also be done of the amount of time the operator spends in the left lane, passing other vehicles, the amount of traffic as it may bear on the miles per unit time and fuel consumption. Measurements may also be made of the center of mass or center of gravity, which may be important in the case of a liquid load, which can move about and possibly destabilize the vehicle. Block 932 represents security functions, such as monitoring of the vehicle seat as described above, voting on alarm conditions sensed by one or a plurality of sensors, so that a single sensor malfunction does not result in extreme action. Block 934 represents collection of data from the in-vehicle computer for analysis on the central server.

A system as described in conjunction with the embodiment can provide vehicular communications associated with a transportation control system which can, depending upon exactly which aspects of the invention are used, to variously monitor the progress of transport, efficiently log pickup and delivery transactions into the main computer system, perform route optimization and help assure operator and load safety and security. These functions are most effectively provided when managed from a centralized transport management computer information system. The functions may be termed track, trace and monitor (TTM). More explicitly, when an embodiment of the invention such as the one described in conjunction with FIGS. 1, 2, 3, 4, 5, 6, and 7 is used, the TTM functions may be viewed as tracking present location, tracing route history, and monitoring of operator and cargo condition. Ideally, in a system according to the invention, the mainframe or central server is connected by way of a routed or internet protocol (IP) network to computers at all transport network fixed locations. In this ideal system, the specialized software manages the data for transport progress, hereafter referred to as TTM, and route optimization and the database for pickup and delivery log and billing. Transport managers access the mainframe for arrival and departure status information. Accounting has access to the database for delivery billing status. Customers may also access some status information such as package log in/log out points and times and delivery status. It is anticipated that not all users will be able to afford or effectively use a complete system including the various aspects of the disclosed embodiment, but substantial gains may be achieved by a system according to any of the various aspects of the invention even if the system is less than optimal.

The VISC system is intended to provide at least one, preferably some, and most preferably all of the following functions, as well as additional functions not listed:
(a) store and forward transaction log entries in video, voice and data form, with entry as binary data and with the ability for manipulation as part of a data base;
(b) store and forward route navigation way points based on landmark sighting, which may be combined with voice entry, tagged with GPS data, any or all of which may be part of the headquarters computer data base;

(c) collect, analyze and report vehicle and operator status information in both normal and emergency situation;

(d) provide automatic voice channel connection to the PSAP and or telephone network based on voice and or mechanical command;

(e) provide, through the use of automatic sensors, capability to automatically report change of operator status while on route;

(f) provide voice code word recognition capability in order to engage or disengage the vehicle security activation and reporting;

(g) continuously and unobtrusively report verification of operator identity and condition during vehicle operation through automatic comparison of physical characteristics such by comparison of current video or stills with archived video or stills, by comparison of the current voice characteristics with stored characteristics, by seat-pressure sensors, or possibly by steering-wheel grip sensors;

(h) remote activation of the 911 emergency call in response to an input from the vehicle operator, or from the corporate fleet Operations center when the vehicle sensors indicate an accident or security violation and the vehicle operator is absent or incapacitated, using the VISC system to generate a transmission from the vehicle, thereby allowing the PSAP to use its site localization equipment to find the vehicle's location;

(i) Corporate Fleet Operations Control Center control of the vehicular microphone as a live microphone, and control of the camera video and the sound control to quietly monitor vehicle cab conditions;

(j) vehicle on-board computer control of VISC rule based algorithm control as in (i) of live mike, video and speaker, under the control of rule-based algorithms, including a rule of what to do if no rule is found;

(k) continuously and unobtrusively measure and report route parameters, distance, time, and location according to rules established and downloaded from the headquarters or mainframe computer over a data communications network;

(l) measure and report axle strain gage measurements of cargo weight load parameters, use cargo weight in conjunction with delivery schedule to provide assurance to the corporate fleet operations control center that the integrity and safety of the cargo has not been compromised;

(m) compute, and display as appropriate, the projected time to next transaction point such as maintenance point, fuel stop, destination way point or cargo destination;

(n) compute and report route variance from the precomputed route plan (as may be updated from time to time), and also report vehicle location parameters;

(o) receive and display download map segments at any level of detail initiated on operator's voice request from the fleet operations mainframe computer, including other pertinent information overlaid on the map such as location of business like restaurants, truck repair, fuel stations and others as may be needed and requested by the vehicle operator;

(p) provide a man-machine interface to a vehicle computer through the use of an adaptable Noun and Verb Table in which nouns, verbs and a course of action can be added while on line and operational;

(q) rules for speech stored, and possibly developed, on the mainframe and downloaded to the VISC so there will be a common speech interface throughout the fleet;

(r) provide a man-machine interface through the use of an infrared link from the hand-held touch screen graphics device & input device (66 of FIG. 7) to the cradle (69), preferably in which the display will be readable in sunlight as the operator holds and operates it in the vehicle cab; and (s) coupling of the GPS location of the vehicle to the PSAP operator during emergency calls so that complex tracing of location of the originator of the wireless call is not necessary.

The vehicle operator may need to interface the public emergency communications system and the corporate management information system at critical times. As mentioned above, Public Safety Answering Points do not interface public or private networks with data terminals, and will not accept a data messages. PSAP's require voice connection to the requesting customer. Corporate operation control centers also need to interface the PSAP and vehicle as well to manage risk and corporate culpability concerning public safety. PSAP can dispatch police, fire and medical emergency response teams. In a vehicular emergency situation, the vehicle operator may not be able to talk directly to a 911 dispatcher, but the fleet operations control center can talk for the vehicle operator if necessary, and can patch voice signals between the PSAP and the vehicle operator if deemed appropriate. The corporate fleet operations control center must also be apprised of the situation so they can quickly take whatever action is appropriate. For example, in the case of an overturned chemical tanker, there may be critical information about the nature of a specialty chemical which the corporate fleet operations control center knows, and can apprise the PSAP of, on how to deal with the specialty chemical. The response team is then prepared with this knowledge before arriving on the scene. A chemical spill and corresponding potential liability would also make it necessary for the corporation to quickly dispatch containment crews.

A Vehicle Information & Safety Computer (VISC) system can be used to make an operational link (a patch) between a data terminal in a vehicle and a 911 dispatch operator and the corporate operations center. By means of the functional elements shown in FIGS. 1 and 2, integrated with artificial intelligence transportation software, a system can be devised to provide safety and security in a manner that can be interfaced to a corporate information network and public safety provider.

In the event that the vehicle is stolen or hijacked, the VISC will connect the corporate operations center with the 911 provider and the operations center personnel can direct police directly to the stolen vehicle. The police can even monitor the audio in the vehicle directly through the conferencing circuitry in the VISC. The vehicle will be partially under operations center control through the use of discrete computer output signals. The horn or lights may be activated at the appropriate time coordinating with 911. The vehicle fuel system may be shut of, stopping the engine. The video or JPEG camera or multiple cameras preferably makes a still frame or series of still frames, or short video sequence picture of the interior of the cab area. This picture may be compressed and put out over the CDPD network to the fleet operations control center. If desired, a video frame can even be converted to fax data and faxed to a recipient, as for example to the police. There the operator can gather additional intelligence and coordinate this information with the 911 operator through the bridge connection provided the VISC system.

While it is recognized that not every transport provider will have a requirement for all of the functions described in conjunction with the embodiments of the invention, use of more of the functions provides greater benefits to the user, but use of even one or a few of the functions may be advantageous.

Other embodiments of the invention will be apparent to those skilled in the art. For example, the vehicle sensors of block 20 of FIG. 2 may be used to monitor any parameter which is important to the load; they may include, if needed, an x-ray or other radiation sensor if the load happened to include photographic film which might be degraded by the presence of such radiation. while the speaker 46 has been described as being dash-mounted, its location is not relevant, so long as the location is a safe one and the vehicle operator can hear it distinctly. The use of intelligent sensors to aid in identifying the authorized operator can be augmented by more conventional safeguards, such as keyboard inputs into which authorization codes must be entered before the engine can be started, and the like. In addition to monitoring the presence of the correct operator, the sensors could be arranged to provide periodic stimuli, the response to which might be usable as indicators of operator alertness. Such alertness information could be used in conjunction with historical data on the same operator to suggest how much longer he could safely operate the vehicle, and the route could be adjusted accordingly. Individual serial or parallel buses to the in-vehicle computer 12 may connect any or all of the sensors, instead of by a single serial bus, such as 701, and a multiplexer associated with each sensor. Naturally, the input function of hand-held display 68 may include provision for digitizing handwritten input, such as signatures or memoranda, which digitized handwriting can be stored to provide a memorial of various transactions. While the truck is illustrated in FIG. 6 as having three axle sets and four tires or wheels per axle set, more or fewer axle sets, and more or fewer than four wheels or tires per axle set may be used. While an aspect of the invention lies in the use of a display with keystroke inputs, such as a liquid-crystal touch screen, separate display and keyboard may be used.

A method, according to at least an aspect of the invention, is for at least one of controlling the routing of a pickup/delivery vehicle (10), monitoring the conditions under which the vehicle (10) is being operated, and verifying delivery of at least a portion of the load. The method comprises at least one set of steps from among first, second, third, fourth, and fifth sets of steps. The first set of steps, includes, prior to a trip, collecting information relating to the characteristics of at least two of (a) the load, (b) the characteristics of the vehicle (10) on which the load will be carried, (c) the characteristics of the vehicle operator (310), (c) characteristics of plural routes over which the vehicle (10) can be routed, (d) relevant traffic regulations/ordinances, and (e) characteristics of the delivery provider and recipient, to thereby generate collected information. The first set of steps also includes the step, prior to initiation of a trip, of processing the collected information, for generating an optimum route, and for providing the route information to the vehicle (10). The second set of steps includes the step of, during the trip, collecting data relating to the operating parameters of the vehicle (10) and the operator (310), and progress along the route, to thereby generate collected in-trip data. The second set of steps also includes the step of processing the collected in-trip data, to thereby generate an updated optimum route, and transmitting information relating to the updated route to the vehicle operator (310). The third set of steps includes the steps of repeating the second set of steps, including the collecting in-trip data, generating an updated optimum route, and transmitting information relating to the updated route to the vehicle operator (310). The fourth set of steps includes the step, concurrently with pick-up of any portion of the load, of gathering pick-up data relating to at least characteristics of the picked-up portion of the load and of the identity of the source of the picked-up portion. The fourth set of steps also includes the step of processing the pick-up data to produce pick-up data for further use, as for example at the corporate fleet headquarters. The fifth set of steps includes the step, concurrently with delivery of a portion of the load to a delivery recipient, of gathering delivery data relating to at least characteristics of the delivered portion of the load and the identity of the delivery recipient. The fifth set of steps also includes the step of processing the delivery data to produce delivery information for further use.

A method for transportation of goods according to another aspect of the invention includes the steps of, at a pickup location, picking up goods with a vehicle (10), and transporting the goods to at least a first drop-off location. The method also includes the step, at the drop-off location, of off-loading goods destined for the drop-off location. According to an aspect of the invention, a mode of the method includes the step, in conjunction with the off-loading, of entering information relating to the off-loading to a portable short-range transceiver by way of a touch-screen display (66, 769) associated with the portable short-range transceiver (IR link 68 and an interface block 69), for transmission of the information by way of the short-range transceiver (68, 69) to a further short-range transceiver (69) fixed to the vehicle (10) and associated with a data processor (12), and storing the information transmitted to the processor in a memory (716).

A vehicular communication system (VISC 11) according to another avatar of the invention includes a switched-circuit cellular radio communication transceiver (34*b*) located in the vehicle (10), and a first CDPD network data transceiver (72), also located in the vehicle (10). A second network data connection (1*p*, 1*p*') arrangement is located at a site (1*c*, 3) remote from the vehicle (10), and communicates with the first CDPD transceiver (72) by way of the network (4). A speech-to-signal converter (140) is included. A vocoder transmitter (124) is coupled to the speech-to-signal converter (140) and to the second network data transceiver (72), for reducing the data rate of uncompressed speech signals coupled from the speech-to-signal converter (140) to the second network data transceiver (72), whereby, or as a result of which, the reduced-data-rate speech signals are generated at the output of the first CDPD network data transceiver (72). A vocoder receiver (724) is coupled to the output of the first CDPD network data transceiver (72), for generating uncompressed signals which represent a synthesized version of the uncompressed speech signals originally applied to the speech-to-signal converter (140). A controller (72, 730, 708, 722, 34*a*) is coupled to the first CDPD network data transceiver (72) and to the switched-circuit cellular radio communication transceiver (34*b*), for responding to commands transmitted over the second network data transceiver (72) by enabling the switched-circuit cellular radio communication transceiver (34*b*) for dialing a particular telephone number (911), and for coupling the uncompressed signals from the output port (724*o*) of the vocoder receiver (724) to the switched-circuit cellular radio communication transceiver (34*b*). As a result, speech signals from the speech-to-signal converter (140) may be compressed, transmitted over the CDPD network (4) to the vehicle (10), uncompressed, and retransmitted over the circuit-switched cellular radio transceiver (34*b*) to be received by the accessed number (911).

In this avatar, the second network data transceiver (72) comprises a network (1*p*, 4). In another version of this avatar, the particular telephone number is 911. In yet another version of this avatar, the vehicle (10) further includes a GPS receiver (14, 16) for generating signals representing the location of the vehicle (10), and a text-to-speech converter 726 coupled to the GPS receiver (14, 16) and to the circuit-switched cellular radio transmitter (34b), for automatically converting the signals representing the location of the vehicle (10) into speech signals having the same meaning, or like import.

In another manifestation of the invention, a camera (60, 62; 720) is located in the cab (10c) of the vehicle (10), for viewing the interior of the cab (10c), including the seating region (412, 414), for generating signals representing the interior of the cab (10c). A transmitter (34b) is included for at least one of point-to-point analog cellular communications, point-to-point digital cellular communications, and satellite communications. A video recording device (716, 718) is coupled to the camera (60, 62; 720). The recording device (716, 718) is capable of capturing one frame of the signals upon occurence of a frame capturing command. A processor (718) is coupled to the video recording device (716, 718), for processing those of the signals representing the one frame into a format suitable for transmission over one of point-to-point analog cellular communications, and point-to-point digital cellular communications, satellite communications. A recording command signal generator (12) is coupled to the video recording device (716, 718) for generating the frame capturing command upon the occurrence of a command from a remote location (1c, 3).

In a particular version of this manifestation, a timer (12) is coupled to the video recording device (716, 718) and to the recording command signal generator (12), for recurrently generating the frame capture command signal upon receipt of a remote command which includes information relating to the time interval between the recorded frames. A further version includes at least one additional camera (720 and ellipses) associated with the vehicle (10), and a multiplexer (718) coupled to the cameras and to the video recording device (716, 718), for selectively coupling to the video recording device (716, 718) the video from only one of the cameras at a time. In this version, the timer (12) comprises multiple memories (716) (or multiple memory portions) for storing information relating to different schedules for commanding the multiplexer (718) and the video recording device (716, 718) to record from the cameras pursuant to the schedule.

In another hypostasis of the invention, a vehicular communication system includes a camera (62, 720) located in the cab (loc) of the vehicle (10), for viewing the interior of the cab (loc), including the seating region (412, 414), and for generating signals representign the interior of the cab (10c). A transmitter (34b) is provided for at least one of point-to-point analog cellular communications, point-to-point digital cellular communications, and satellite communications. A video recording device (716, 718) is coupled to the camera (62, 720) for receiving video signals therefrom. The recording device (716, 718) is capable of capturing one frame of the signals upon occurence of a frame capture command. A processor (718) is coupled to the video recording device (716, 718), for processing those of the signals representing the one frame into a format suitable for transmission by way of, or over, a transmitter (34b) for one of point-to-point analog cellular communications, point-to-point digital cellular communications, and satellite communications. A trigger-point processor (12, 13) is coupled to at least one sensor (62, 410) located in the cab (10c), for comparing signals from the sensor (62, 410) with stored signals, for generating a trigger-point signal based upon the results of the comparison. A frame capture command signal generator (12, 13) is coupled to the video recording device (716, 718) for generating the frame capture command upon the occurrence of the trigger-point command.

In another objectification of the invention, a vehicle communication system includes a communications transceiver (34a, 34b) fastened to the body of the vehicle (10), for providing communications to stations (1c, 3) outside the vehicle (10). The communications transceiver (34, 34b) includes a short-range electromagnetic transceiver (69) associated with, or operable within, the cab (10c) of the vehicle (10), which may include the cargo bay (10cb) of the vehicle (10). A portable transceiver (66, 769) is located within the cab (10c) of the vehicle (10) and available for hand-held use by an operator (310) of the vehicle (10), the portable electromagnetic transceiver (66, 769) being capable of real-time short-range communication with the short-range electromagnetic transceiver (69) of the communications transceiver (34a, 34b).

In this objectification, the short-range electromagnetic transceiver (69) of the communication transceiver (34a, 34b) and the short-range electromagnetic transceiver (66, 769) of the portable transceiver use one of radio, infrared, and light electromagnetic communications.

In another version of this objectification of a vehicle communications system, the portable transceiver (69) includes a visual touch-screen display (66, 769) by which commands may be inputted to the communications transceiver (34a, 34b).

What is claimed is:

1. A communication system for a vehicle, comprising:

a switched-circuit cellular radio communication transceiver located in said vehicle;

a first CDPD network data transceiver located in said vehicle;

a second network data connection means located at a site remote from said vehicle, and communicating with said first CDPD transceiver by way of said network;

a speech-to-signal converter;

a vocoder transmitter coupled to said speech-to-signal converter and to said second network data transceiver, for reducing the data rate of uncompressed speech signals coupled from said speech-to-signal converter to said second network data transceiver, whereby the reduced-data-rate speech signals are generated at the output of said first CDPD network data transceiver;

a vocoder receiver coupled to said output of said first CDPD network data transceiver, for generating uncompressed signals which represent a synthesized version of said uncompressed speech signals;

control means coupled to said first CDPD network data transceiver and to said switched-circuit cellular radio communication transceiver, for responding to commands transmitted over said second network data transceiver by enabling said switched-circuit cellular radio communication transceiver for dialing a particular telephone number, and for coupling said uncompressed signals to said vocoder receiver to said switched-circuit cellular radio communication transceiver, whereby speech signals from said speech-to-signal converter are compressed, transmitted over said CDPD network to said vehicle, uncompressed, and retransmitted over said circuit-switched cellular radio transceiver to be received by the accessed number.

2. A system according to claim 1, wherein said second network data transceiver comprises a LAN connected to a port of said network.

3. A communications system according to claim 1, wherein said particular telephone number is 911.

4. A communications system according to claim 1, wherein said vehicle further comprises:
   a GPS receiver for generating signals representing the location of said vehicle
   signal-to-speech conversion means coupled to said GPS receiver and to said circuit-switched cellular radio transmitter, for automatically converting said signals representing the location of said vehicle into speech signals having like import.

* * * * *